United States Patent
Jou et al.

(10) Patent No.: US 8,767,823 B2
(45) Date of Patent: Jul. 1, 2014

(54) METHOD AND APPARATUS FOR FRAME MEMORY COMPRESSION

(75) Inventors: Fan-Di Jou, Hsinchu (TW); Chih-Hsu Yen, Hsinchu (TW); Chun-Lung Lin, Yunlin (TW); Tian-Jian Wu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 425 days.

(21) Appl. No.: 13/178,510

(22) Filed: Jul. 8, 2011

(65) Prior Publication Data

US 2012/0250758 A1   Oct. 4, 2012

Related U.S. Application Data

(60) Provisional application No. 61/469,095, filed on Mar. 30, 2011.

(51) Int. Cl.
*H04N 7/12* (2006.01)
*H04N 7/26* (2006.01)

(52) U.S. Cl.
CPC ... *H04N 19/00121* (2013.01); *H04N 19/00272* (2013.01); *H04N 19/00096* (2013.01); *H04N 19/00169* (2013.01); *H04N 19/00127* (2013.01)
USPC ............. 375/240.03; 375/240.23; 375/240.24

(58) Field of Classification Search
CPC .................................. H04N 7/12; H04N 19/00
See application file for complete search history.

(56) References Cited

U.S. PATENT DOCUMENTS

| 5,144,424 A | * | 9/1992 | Savatier ................. 375/240.03 |
| 5,907,500 A | * | 5/1999 | Nadehara ...................... 708/700 |
| 6,256,347 B1 | * | 7/2001 | Yu et al. ................... 375/240.13 |

(Continued)

FOREIGN PATENT DOCUMENTS

| CN | 1073313 A | 6/1993 |
| CN | 1246246 A | 3/2000 |
| TW | I277013 | 3/2007 |

OTHER PUBLICATIONS

T.B. Yng, B.k. Lee, and H. Yoo, "A low complexity and lossless frame memory compression for display devices," Consumer Electronics, IEEE Transactions on, vol. 54, No. 3, pp. 1453-1458, Aug. 2008.

(Continued)

*Primary Examiner* — Tung Vo
*Assistant Examiner* — Joseph Becker
(74) *Attorney, Agent, or Firm* — Lin & Associates IP, Inc.

(57) ABSTRACT

A method for frame memory compression divides each of a plurality of image frames in a frame memory into a plurality of blocks and quantizes a plurality of pixel values inside each block according to a predefined parameter, thereby generating a quantized block and a plurality of removed bits from the binary representation of the plurality of pixel values. A predictor is used to produce a residual block for the quantized block. A variable length encoder takes the residual block as an input and produces a coded bitstream. A packing unit is used to take the coded bitstream and the number of removed bits generated by the quantizer as inputs, so as to produce an entire codeword sequence of the block that meets a target bit rate by using a structure called group of blocks (GOB) to flexibly share available spaces of the blocks in the same GOB.

16 Claims, 21 Drawing Sheets

(56) References Cited

U.S. PATENT DOCUMENTS

| | | | |
|---|---|---|---|
| 6,693,961 | B1 | 2/2004 | Azadegan |
| 7,489,729 | B2 | 2/2009 | Chen et al. |
| 7,599,435 | B2 | 10/2009 | Marpe et al. |
| 2006/0171685 | A1 | 8/2006 | Chen et al. |
| 2007/0223823 | A1* | 9/2007 | Islam et al. .................. 382/232 |
| 2009/0245391 | A1 | 10/2009 | Youn |
| 2010/0162073 | A1* | 6/2010 | Myung et al. ................ 714/752 |

OTHER PUBLICATIONS

T. Y. Lee, "A new frame-recompression algorithm and its hardware design for MPEG-2 video decoders," Circuits and Systems for Video Technology, IEEE Transactions on, vol. 13, No. 6, pp. 529-534, Jun. 2003.

T. Y. Lee, "A new algorithm and its implementation for frame recompression," Consumer Electronics, IEEE Transactions on, vol. 47, No. 4, pp. 849-854, Nov. 2001.

T. L. B. Yng, B.-G. Lee, and H. Yoo, "Low Complexity, Lossless Frame Memory Compression using Modified Hadamard Transform and Adaptive Golomb-Rice Coding," IADIS International Conference Computer Graphics and Visualization, pp. 89-96, 2008.

Y. Lee, C.-E. Rhee, and H.-J. Lee, "A New Frame Recompression Algorithm Integrated with H.264 Video Compression," Circuits and Systems, IEEE International Symposium on, pp. 1621-1624, May 2007.

Y. D. Wu, Y. Li, and C. Y. Lee, "A Novel Embedded Bandwidth-Aware Frame Compressor for Mobile Video Applications," IEEE Intelligent Signal Processing and Communication System, pp. 1-4, Feb. 2009.

S.-H. Lee, M.-K. Chung, S.-M. Park, and C.-M. Kyung, "Lossless frame memory recompression for video codec preserving random accessibility of coding unit," Consumer Electronics, IEEE Transactions on, vol. 55, No. 4, pp. 2105-2113, Nov. 2009.

S. Lee, N. Eum, M.-K. Chung, and C.-M. Kyung, "Low latency variable length coding scheme for frame memory recompression," Multimedia and Expo, IEEE International Conference on, pp. 232-237, Jul. 2010.

C.-C. Chen, S.-S. Chen, O.T.C. Chen, C.-F. Chen, and F.-C. Chen, "Effective memory reduction scheme used for reference frames in H.264/AVC video codec," Circuits and Systems, IEEE International Symposium on, pp. 1549-1552, Aug. 2005.

Y. Jin, Y. Lee, and H.-J. Lee, "A New Frame Memory Compression Algorithm with DPCM and VLC in a 4×4 Block," EURASIP Journal on Advances in Signal Processing, vol. 2009, Article ID 629285, 18 pages, 2009.

* cited by examiner

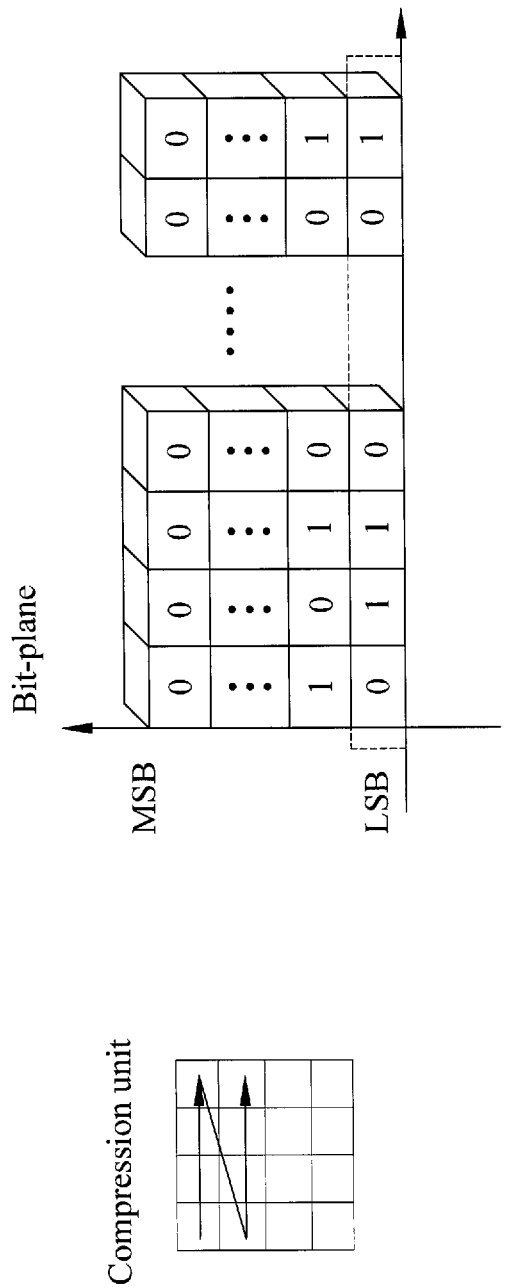

| -1 | -8 | 1 | -6 |
|----|----|----|----|
| 1  | 2  | -2 | 5  |
| -1 | -4 | 0  | 4  |
| 1  | 1  | -1 | 2  |

FIG. 6

| GR(0) | | | GR(1) | | | GR(2) | | | GR(3) | | |
|---|---|---|---|---|---|---|---|---|---|---|---|
| Value | codeword (prefix+suffix) | Len | Value | codeword (prefix+suffix) | Len | Value | codeword (prefix+suffix) | Len | Value | codeword (prefix+suffix) | Len |
| 0 | 10 | 2 | 0 | 10 | 2 | 0 | 10 | 2 | 0 | 100 | 2 |
| 1 | 11 | 2 | 1 | 11 | 2 | 1 | 11 | 2 | 1 | 101 | 2 |
| -1 | 010 | 3 | -1 | 010 | 3 | -1 | 010 | 3 | -1 | 110 | 3 |
| 2 | 011 | 3 | 2 | 011 | 3 | 2 | 011 | 3 | 2 | 111 | 3 |
| -2 | 0010 | 4 | -2 | 0010 | 4 | -2 | 00100 | 5 | -2 | 0100 | 4 |
| 3 | 0011 | 4 | 3 | 0011 | 4 | 3 | 00101 | 5 | 3 | 0101 | 4 |
| -3 | 00010 | 5 | -3 | 000100 | 6 | -3 | 00110 | 5 | -3 | 0110 | 4 |
| 4 | 00011 | 5 | 4 | 000101 | 6 | 4 | 00111 | 5 | 4 | 0111 | 4 |
| -4 | 0000100 | 7 | -4 | 000110 | 6 | -4 | 0001000 | 7 | -4 | 001000 | 6 |
| 5 | 0000101 | 7 | 5 | 000111 | 6 | 5 | 0001001 | 7 | 5 | 001001 | 6 |
| -5 | 0000110 | 7 | -5 | 00001000 | 8 | -5 | 0001010 | 7 | -5 | 001010 | 6 |
| 6 | 0000111 | 7 | 6 | 00001001 | 8 | 6 | 0001011 | 7 | 6 | 001011 | 6 |
| -6 | 000001000 | 9 | -6 | 00001010 | 8 | -6 | 0001100 | 7 | -6 | 001100 | 6 |
| 7 | 000001001 | 9 | 7 | 00001011 | 8 | 7 | 0001101 | 7 | 7 | 001101 | 6 |
| -7 | 000001010 | 9 | -7 | 00001100 | 8 | -7 | 0001110 | 7 | -7 | 001110 | 6 |
| ... | ... | ... | ... | ... | ... | ... | ... | ... | ... | ... | ... |
| 0 | 000000000000 | 12 | 0 | 000000000000 | 12 | 0 | 000000000000 | 12 | 0 | 00000000000 | 11 |

FIG. 7

|   |   |   |
|---|---|---|
| 1 | 2 | 3 |
| 4 | 5 | 6 |
| 7 | 8 | 9 |

FIG. 17

| Video sequences | Resolution | Frame number |
|---|---|---|
| pedestrian_area | 1080p | 375 |
| blue_sky | 1080p | 217 |
| riverbed | 1080p | 250 |
| tractor | 1080p | 690 |
| toys_and_calendar | 1080p | 250 |
| rush_hour | 1080p | 500 |
| station2 | 1080p | 313 |
| sunflower | 1080p | 500 |

FIG. 25

METHOD AND APPARATUS FOR FRAME MEMORY COMPRESSION

CROSS-REFERENCE TO RELATED APPLICATION

The present application claims priority benefit of U.S. Provisional Application No. 61/469,095, filed Mar. 30, 2011, which is hereby incorporated by reference in its entirety.

TECHNICAL FIELD

The disclosure generally relates to a method and apparatus for frame memory compression (FMC).

BACKGROUND

Video compression standards, such as MPGE-2, MPEG-4, H.263 and H.264/AVC, have been extensively used in video related applications. The performance of a video processor with the compression standards is often limited by frame memory size and system bandwidth. To speedup a video processor, frame memory compression is applied, which could be used to reduce frame memory size by compressing the data to be stored in frame memory. Additionally, since data stored in frame memory is reduced by FMC, the amount of data transferred on the bus could be thus greatly lessened to meet the bandwidth constraint. Existing techniques on the frame memory compression may be categorized into two types. One type of FMC is based on spatial domain. The other type of FMC is based on frequency domain.

The FMC based on spatial domain utilizes the correlation of pixels in spatial domain to predict pixel values. For example, some techniques for reducing buffered-frame memory sizes and accesses in a video Codec, such as H.264/AVC, decide an associated storage type for each micro block (MB) through a new added decision unit, and perform a simple compression according to the associated storage type of the MB. Some FMC algorithms embed a compression unit between a processing core and an external memory, compute results for a plurality of prediction modes by taking a 4×4 block as a compression unit, and select a best computed compression result. One frame memory recompression technique for video codec uses a pixel-based lossless compression method, and utilizes an address table to preserve random accessibility of coding unit. One technique designs a coding scheme with law latency and variable length by taking latency into consideration.

FIG. 1 shows an exemplary schematic view illustrating a FMC technique based on spatial domain. The technique uses a fixed compression ratio and near-lossless FMC to reduce the bandwidth of hardware components and decrease the usage of frame memory. As shown in FIG. 1, a 4×4 block is taken as a compression unit, The FMC technique utilizes 8 prediction modes (Mode 1~Mode 8) and associates simple quantization, differential pulse code modulation (DPCM), and variable length coding (VLC) such as Golomb-Rice coding, to perform frame memory compression. Using intra prediction modes for performing FMC may require high complexity, and do not show much significance on the compression results for small compressed blocks.

The FMC based on frequency domain converts the pixels from spatial domain into frequency domain, and utilizes clustering effect of power energy in frequency domain for compressing data. For example, one video memory reduction technique uses hierarchical transform such as Harr transform, to convert the pixels from spatial domain into frequency domain, and performs quantization and run length coding on the obtained transformation coefficients. One lossy FMC technique considers gray-level pixel data, and uses fixed or variable quantization to perform frame memory compression. Some techniques use modified Hadamard transform and adaptive Golomb-Rice coding to perform frame memory compression for display devices. Some techniques use modified Hadamard transform and adaptive Golomb-Rice coding to perform frame memory compression, by considering a fixed compression efficiency of 50%. Some technique uses discrete Cosine transform and modified bit plane zonal coding to implement a frame compressor for mobile video applications. The FMC based on frequency domain may require high computation or hardware complexity and may not be proper for the applications with low-latency requirements.

SUMMARY

The exemplary embodiments of the present disclosure may provide a method and apparatus for frame memory compression.

A disclosed exemplary embodiment relates to a method for frame memory compression, adapted to a video processor at least including a quantizer, a predictor, a variable length encoder, and a packing unit. The method comprises: dividing each of a plurality of image frames in a frame memory into a plurality of blocks for taking a block as a compression unit; applying the quantizer to quantize a plurality of pixel values inside the block according to a predefined parameter, thereby generating a quantized block and a plurality of removed bits from the binary representation of the plurality of pixel values; applying the predictor to produce a residual block for the quantized block; applying the variable length encoder to take the residual block as an input and produce a coded bitstream; and applying the packing unit to take the coded bitstream and the plurality of removed bits generated by the quantizer as inputs, so as to produce an entire codeword sequence of the block that meets a target bit rate by using a structure called group of blocks (GOB) to flexibly share available spaces of the blocks in the same GOB.

Another exemplary embodiment relates to an apparatus for frame memory compression, which may be adapted to a video processor with each of a plurality of image frames in a frame memory being divided into a plurality of blocks for taking a block as a compression unit. The apparatus comprises: a quantizer for quantizing a plurality of pixels inside the block according to a quantization parameter, thereby generating a quantized block and a plurality of removed bits from a binary representation of the plurality of pixel values; a predictor that uses two control inputs to produce a residual block, according to boundary data of the block and the quantized block; a variable length coder that takes the residual block as an input and produce a coded bitstream by using a table-lookup method; and a packing unit that takes the coded bitstream and the plurality of removed bits generated by the quantizer as inputs, so as to produce an entire codeword sequence of said block that meets a target bit rate by using a structure called group of blocks (GOB) to flexibly share available spaces of the blocks in the same GOB.

The foregoing and other features, aspects and advantages of the disclosure will become better understood from a careful reading of a detailed description provided herein below with appropriate reference to the accompanying drawings.

BRIEF DESCRIPTION OF THE DRAWINGS

FIGS. 4A-4C show an illustration example of the quantization, where QP=1, consistent with certain disclosed embodiments.

FIG. 6 shows a final residual block of the encoding block shown in FIG. 5A, consistent with certain disclosed embodiments.

FIG. 7 shows an illustration of exemplary variable length coding tables in Golomb-Rice coding, consistent with certain disclosed embodiments.

FIG. 17 shows and an exemplary pixel index for illustrating an exemplary prediction priority, consistent with certain disclosed embodiments.

FIG. 25 shows exemplary experimental parameters, where 8 typical video sequences with 1080p resolution are used, consistent with certain disclosed embodiments.

DETAILED DESCRIPTION OF THE EXEMPLARY EMBODIMENTS

The exemplary embodiments disclose an efficient FMC technique to compress at least an input image. The at least an input image may be a static single image or a frame from a video stream. This FMC compression technology is block-based, that means the block is used as a compression unit. Given an image frame of size W×L, the image frame may be divided into a plurality of m×n blocks and the total number of divided blocks is (W/m)×(L/n), where m and n are smaller than width (W) and length (L) of the image frame. If the W and L of the image frame are not divisible by m and n, some extra processing may be applied in addition when using this technology.

This FMC technology of the disclosed exemplary embodiments is to compress the blocks. Note that the block is not entirely compressed independently. The subsequent bit rate control will take a plurality of neighboring blocks into account to perform the compressible bit allocation among the blocks of the same group. In other words, the disclosed exemplary embodiments compresses an image frame by encoding each m×n block one-by-one in a video Codec, and guarantees that the compression rate of each encoded block meets a given target bit rate (a predefined system parameter).

Figure 1:
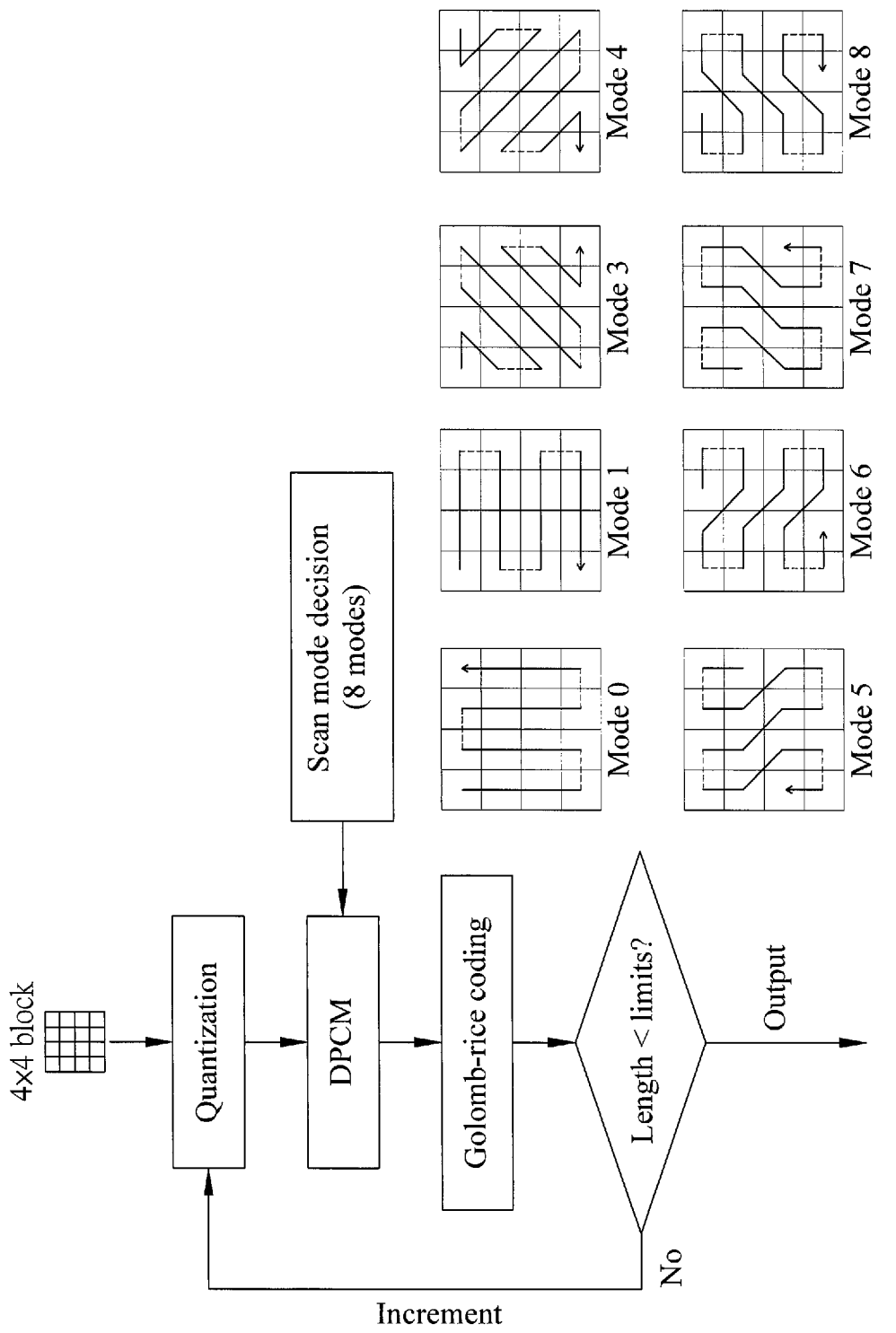
FIG. 1 shows an exemplary schematic view illustrating a FMC technique based on spatial domain.
Figure 2:
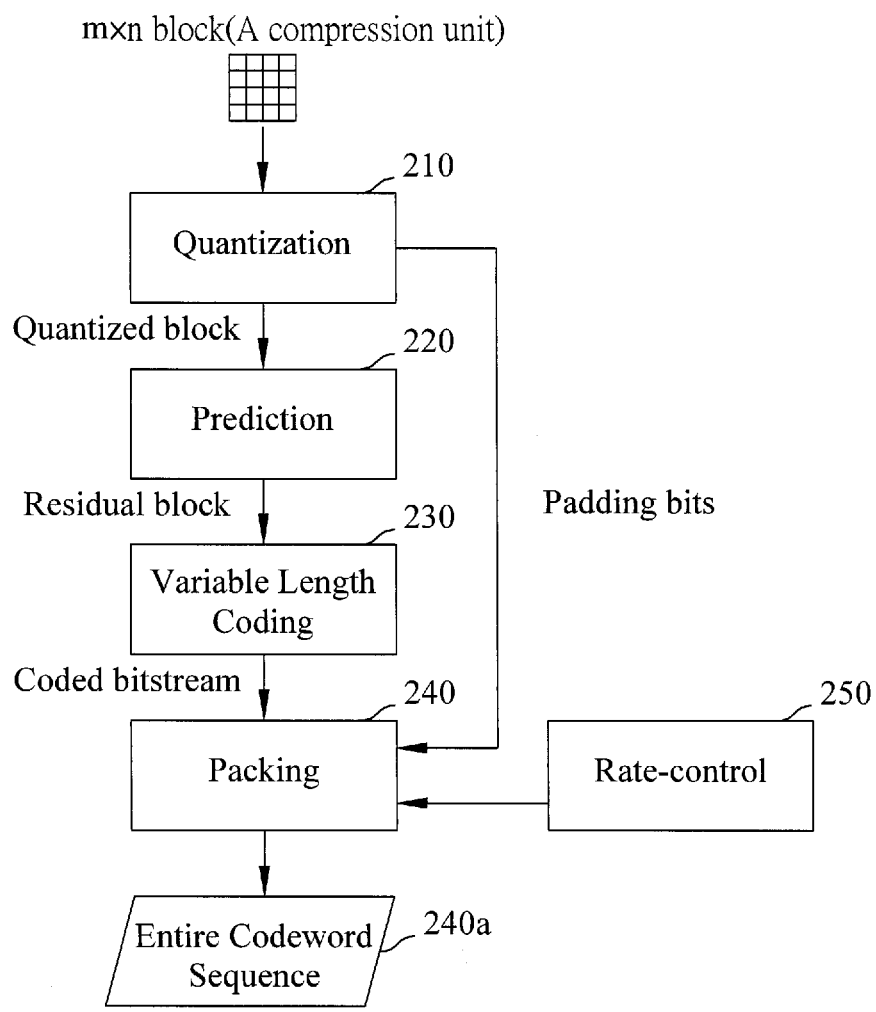
FIG. 2 shows an exemplary flow diagram illustrating the compression technique for each m×n block, consistent with certain disclosed embodiments.

In the disclosed exemplary embodiments, the compression technique for each m×n block may comprise portions of quantization, prediction, variable length coding, and packing and rate-control. As shown in FIG. 2, the quantization 210 takes an m×n block as an input and quantizes the pixel values inside the block according to a predefined parameter QP, so as to an m×n quantized block is generated. The technology of quantization 210 is slightly different from the conventional image compression. The quantization here is to save the removed bits as the padding bits for compensation when remaining vacancy is available in packing 240. The prediction 220 takes the m×n quantized block as an input and produces an m×n residual block. The variable length coding 230 takes the m×n residual block as an input and produces a coded bitstream. The packing 240 takes the coded bitstream and the padding bits generated by the quantization 210 as inputs and produces an entire codeword sequence 240a that meets a target bit rate. The rate-control 250 is designed by using a structure called group of blocks (GOB) to flexibly share available spaces of the blocks in the same GOB. A GOB is a group of neighboring blocks, and is a basic rate-control unit and also a random access unit.

When performing variable length coding 230, the flowchart of FIG. 2 performs the coding on all the pixels of the block before moving to the packing 240. This flowchart of FIG. 2 may allow minor variations in details. For example, each block may be processed pixel-by-pixel, in other words, to process pixel recursively. That is, to determine whether the available bit rate R(i) is exceeded a threshold T after finishing processing a pixel i. Once exceeding, the subsequent pixels in the block are no processed, and the flowchart move to the packing 240 directly. This variation is shown as FIG. 3.

The followings describe each portion in details. In performing the quantization 210, the predefined parameter QP may be used to control the quantization level. The manner to quantize is to remove certain bits from the binary representation of the pixel value. The number of bits to be removed may be decided by the user through the predefined parameter QP. The order of the removal of bits is from the least significant bit (LSB) to the most significant bit (MSB) in the binary representation of the pixel value. For example, the lowest quantization level, i.e. QP=0, indicates that each pixel is with full resolution without being quantized, in other words, no bit is removed. The quantization level of one, i.e. QP=1, means that the least significant bit of each pixel is removed. The quantization level of two, i.e. QP=2, means that the two least significant bits are removed and so forth. The maximum value of QP may be decided by how many bits are employed to represent a pixel value; for example, the maximum value of QP is 8 if each pixel value is represented by 8 bits. Particularly, a special design in the disclosure is that the removed bits, referred to as padding bits, are kept and delivered to the packing 240 for compensation purpose. After quantization, the processed block, called quantized block, is used as the input of the prediction 220.

Figure 4C:
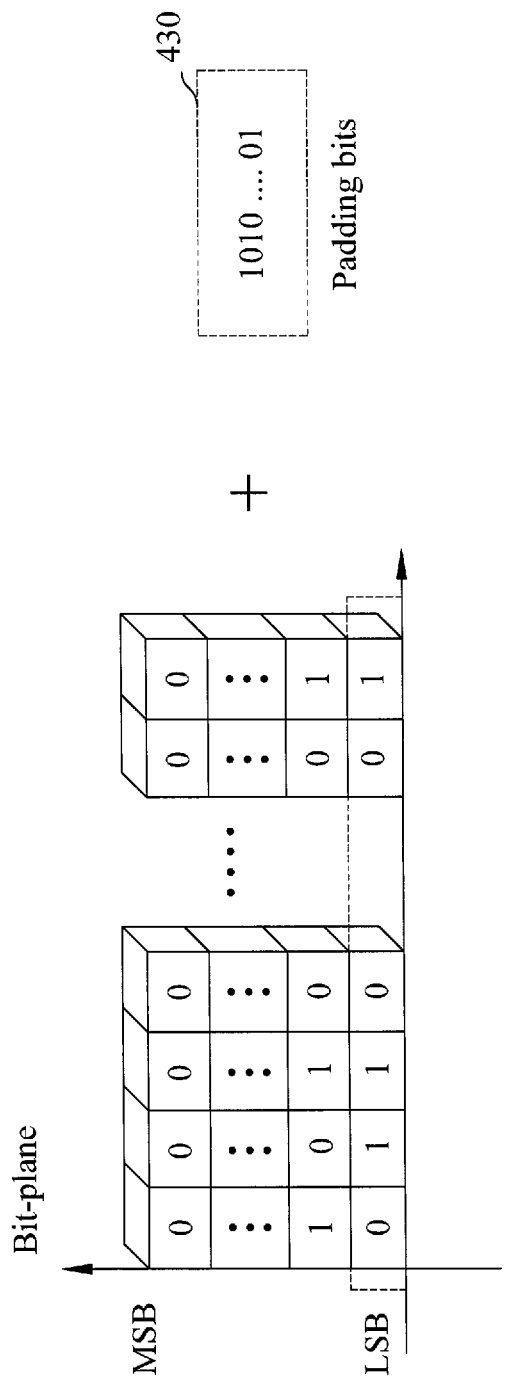

FIGS. 4A-4C show an illustration example of the quantization 210 step, where QP=1, consistent with certain disclosed embodiments. FIG. 4A shows a compression unit, i.e. an m×n block. FIG. 4B shows a bit-plane of the m×n block, i.e. binary representation of each pixel value in the m×n block of FIG. 4A, where the least significant bit of each pixel is to be removed. After quantization with QP=1, the least significant bit of each pixel is removed, and all the removed bits are kept as padding bits 430, as shown in FIG. 4C. In this disclosure, the encoding blocks are allowed to have different QP parameters, and QP[i] represents the QP for block i.

In performing the prediction 220, the information of boundary pixel values of the above and left neighboring blocks and the pixel values in the same block already coded is used to predict the encoding pixels (i.e., the pixels to be encoded). A prediction function computes the pixel value of the pixel to be predicted. The prediction function uses the boundary pixel values of the above and left neighboring blocks and the pixel values in the same block already coded as input parameters. The prediction function, for example, may be a linear function such as a simple average function or a weighting function. Many predictions function are applicable, and the average function or weighting function is only an example. Prediction error is defined as the error between the predicted pixel value and the actual pixel value. For the block without either above neighboring block or left neighboring block, the only available pixel value information may be used in combination with the information of the pixel values in the same block already coded to perform prediction, when one of the information on the boundary pixel values of the above or left neighboring blocks is not available. For the block in the upper left corner, i.e., the block with neither above neighboring block nor left neighboring block, the information of the pixel values in the same block already coded may be used to perform prediction, when neither of the information on the boundary pixel values of the above nor left neighboring blocks is available.

The entire prediction may be performed pixel-by-pixel until all the m×n pixels of the encoding block are predicted. The m×n pixels may be processed one-by-one in a special predetermined order, called coding order. For example, the special order may be designed as followings. The entire prediction may start with the bottom-right pixel. The n−1 pixels of the rightmost column (the n-th column) are predicted with the first priority (minus the starting pixel), and the prediction of n−1 pixels of the bottom-most row (the n-th row) is the second-priority (minus the starting pixel). The coding order may be varied. However, the order described as above is as a matter of principle, instead of complete description of a restrictive order.

Figures 5A, 5B:
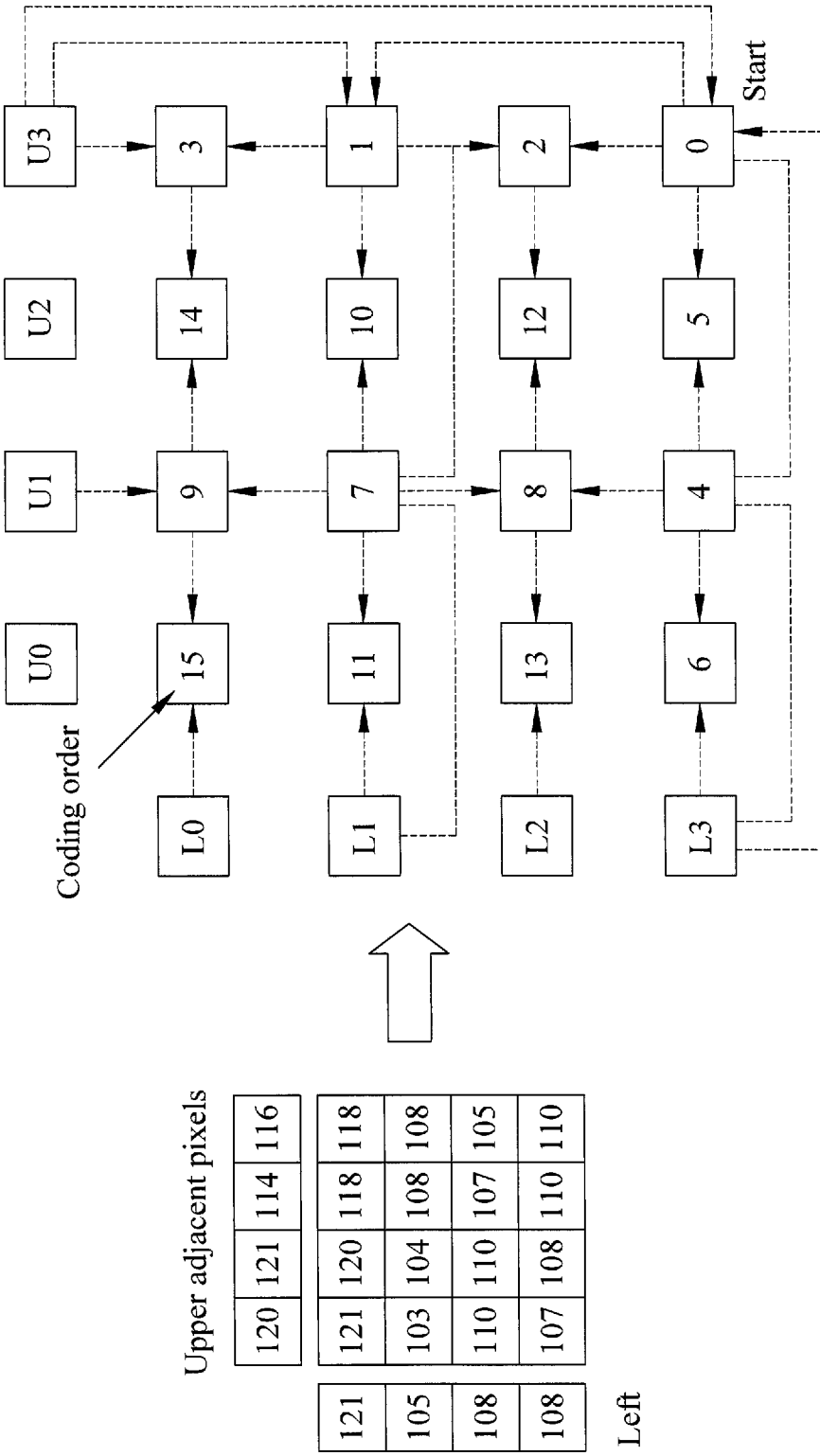
FIGS. 5A-5B show an illustration example of performing the prediction for a 4×4 block, consistent with certain disclosed embodiments.
Figure 6:
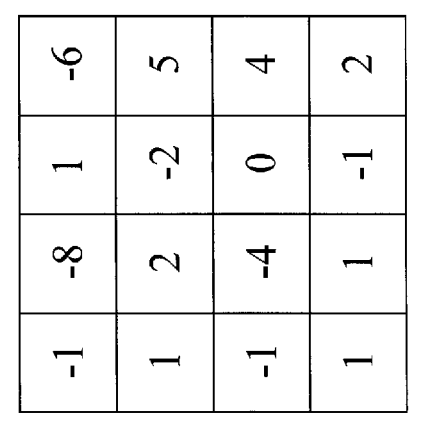

For ease of illustration, a 4×4 block (m=n=4) is taken as an example to illustrate how to perform the prediction, but is not limited to the case in this disclosure. FIGS. 5A-5B show an illustration example of performing the prediction for a 4×4 block, consistent with certain disclosed embodiments. FIG. 5A shows a 4×4 block with four upper adjacent pixels and four left adjacent pixels. As depicted in FIG. 5B, this example assumes that the four upper adjacent pixels, labeled as U0, U1, U2 and U3, and the four left adjacent pixels, labeled as L0, L1, L2 and L3, are all available. As depicted in an exemplary special coding order of FIG. 5B, the prediction 220 may begin with coding order "0" at the bottom-right pixel, followed by the pixel right in the middle with coding order "1" and so forth. Consider that an exemplary average function is used as the prediction function. Accordingly, the first pixel is predicted by the value (L3+U3)/2 (i.e. (108+116)/2), and the prediction error (i.e., the residual) for the first pixel is 2 (i.e. 112 minus 110). By the same way, the second pixel is predicted by (116+110)/2=118, which is the average of U3 and the first pixel. As a result, the prediction error for the first pixel is 5 (i.e. 113 minus 108). The final corresponding residual block of the encoding block shown in FIG. 4B is depicted in FIG. 6.

In performing the variable length coding 230, many variable-length coding schemes may be used. For example, when the variable length coding 230 is performed, the used variable-length code may be Huffman code, Golomb-Rice code, and so on. This disclosure may integrate some enhancement to make the used variable-length coding compression more efficient. For example, the used variable-length code may be based on a probability distribution of the values, where the value with higher probability is coded with a shorter codeword. A plurality of coding probability distributions may be used. According to the location of the pixel in the block and whether boundary pixel values of the above and left neighboring blocks are available, an appropriate coding probability distribution is selected. Each probability distribution is realized with an individual probability coding table, where each entry of a coding table contains at least two fields. The two fields are a coding value and its corresponding codeword. Each coding table includes a special entry. The codeword of the special entry is either all zeros or all ones.

Through using a representative coding value to replace a plurality of coding values, the number of entries in the coding table may be reduced. The mapping between the coding value and codeword in the coding table is a many-to-one relation. In other words, a plurality of coding values may be mapped to the same codeword. The largest length of codewords may be controlled by the many-to-one property. For example, those residuals whose original codeword lengths are longer than a predefined threshold would be assigned to codewords whose codeword lengths are shorter than the threshold. As a result, several different residuals may be allowed to be mapped to the same codeword. In this disclosure, one may append some additional bits to identify the exact residual from a many-to-one mapped codeword when the available bit rate of an encoding block is not exhaustively utilized after the m×n residuals have been completely encoded.

Different kinds of exemplary coding tables may be generated in different variable length codings, such as Huffman coding or Golomb-Rice coding. FIG. 7 shows an illustration of exemplary variable length coding tables in Golomb-Rice coding, consistent with certain disclosed embodiments. There are many special properties of the exemplary coding tables. One of the properties is that the size of residual space may be reduced by using a common residual value to represent several different residual values. For example, if an image pixel is represented by 7 bits after being quantized by quantization level of one, the size of residual space is 255, ranged from −127 to 127. Accordingly, in the exemplary coding tables, the size of residual space may be reduced to 127, ranged from −64~63. In this example of FIG. 7, the residual value −127 may be equivalent to the residual value 1 in the reduced residual space.

Figure 8:
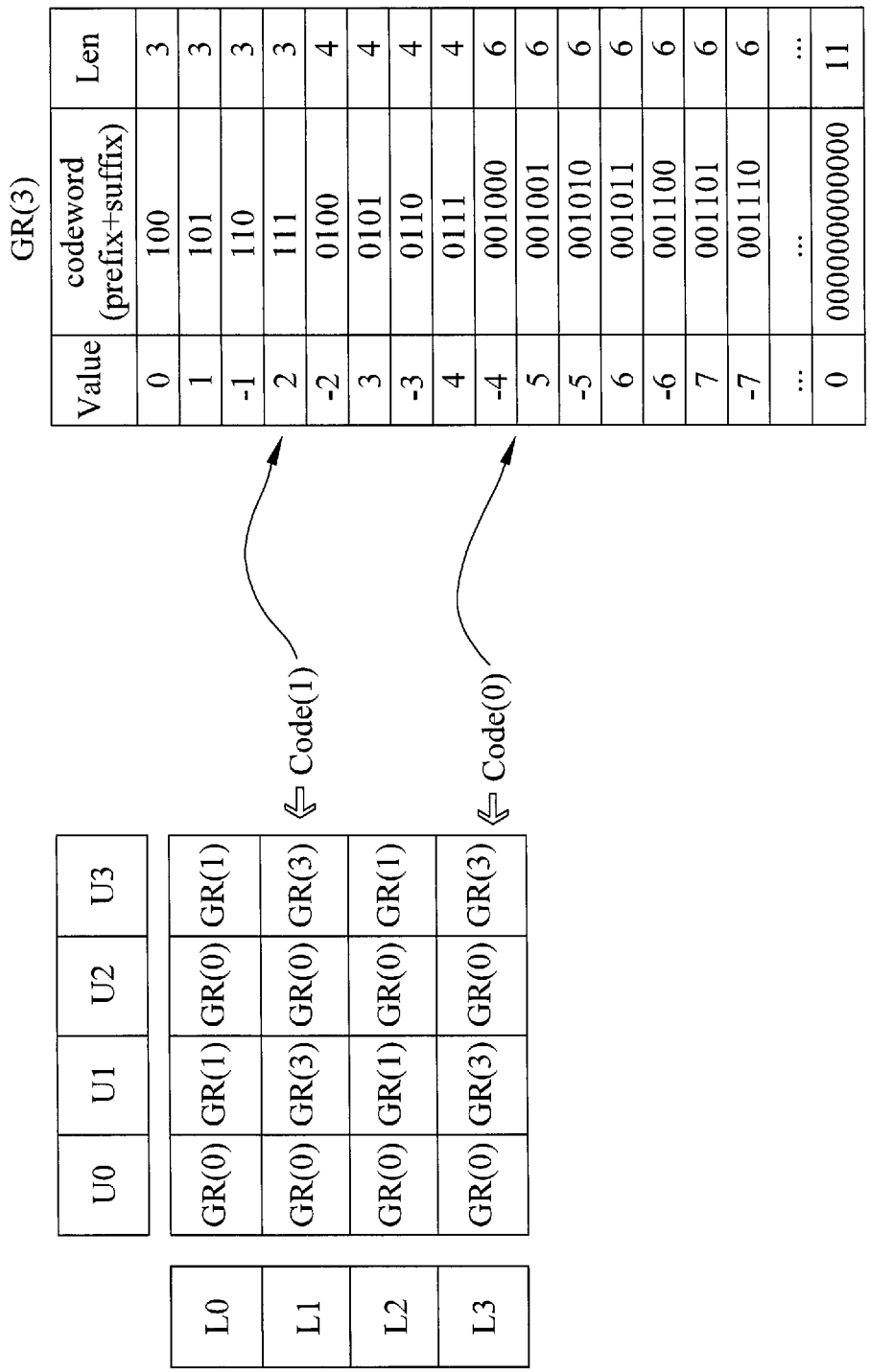
FIG. 8 shows an exemplary Golomb-Rice coding strategy for the non-boundary blocks, consistent with certain disclosed embodiments.

A coded bitstream of an input residual block is a plurality of successive bit streams, which are constructed by concatenating the codewords of the residual block one-by-one in a special coding order. Given a residual block, the m×n residual values are compressed by one of the exemplary variable length coding tables according to their positions and whether or not it is on the boundary. In the disclosure, many coding strategies may be employed according to the positions of residuals to be encoded. One exemplary Golomb-Rice coding strategy for the non-boundary blocks is shown in FIG. 8, and one exemplary Golomb-Rice coding strategy for the residual blocks on the boundary is shown in FIG. 9A and FIG. 9B.

Take shown in FIG. 6 as an example. Assume that the residual block has four upper adjacent residual values of four upper adjacent pixels U0, U1, U2 and U3, and four upper adjacent residual values of four left adjacent pixels L0, L1, L2 and L3. Referring to FIG. 8, for an exemplary special coding order of FIG. 5B, code(0) is the Golomb-Rice code of 2 (2 is the residual value of pixel 0 in FIG. 6), and Golomb-Rice code table GR(3) is used. Therefore, the corresponding codeword is 111 with length 3. While code(1) is the Golomb-Rice code of 5 (5 is the residual value of pixel 1 in FIG. 6), and Golomb-Rice code table GR(3) is used. Therefore, the corresponding codeword is 001001 with length 6. The exemplary coding strategy of how to select and use a corresponding Golomb-Rice code table may be by analyzing experimental data.

Figure 9A:
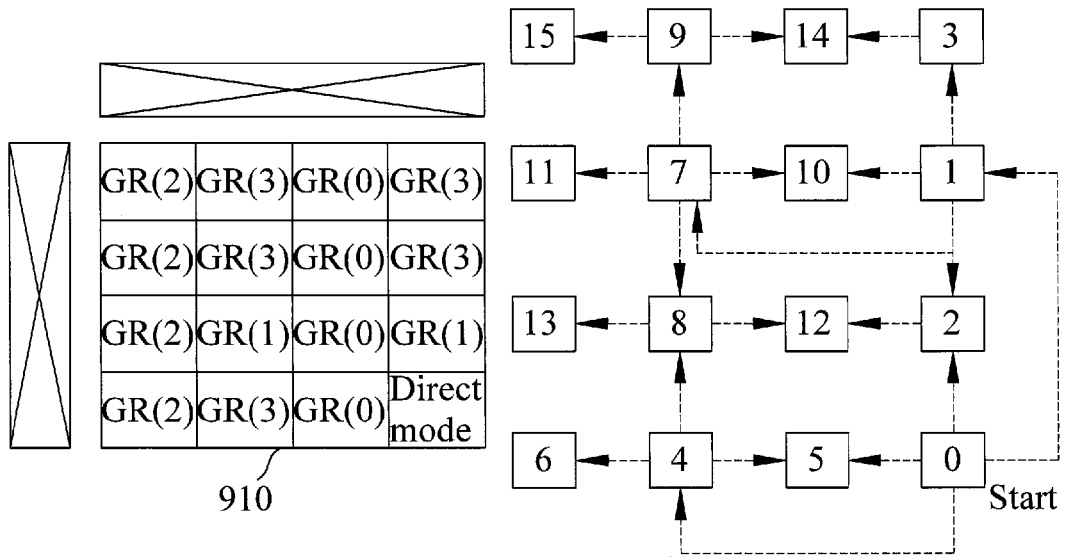
FIG. 9A and FIG. 9B show an exemplary Golomb-Rice coding strategy for the boundary blocks, consistent with certain disclosed embodiments.
Figure 9B:
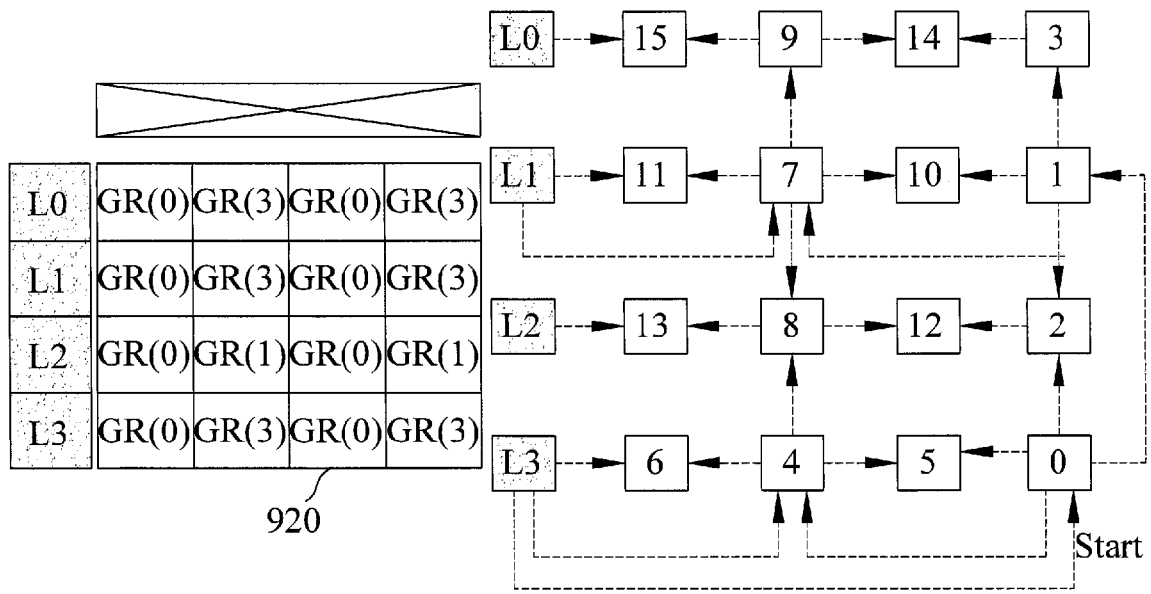

In the example of FIG. 9A, assume that a residual block 910 is on the boundary with neither four upper adjacent pixels nor four left adjacent pixels. According to the exemplary Golomb-Rice coding strategy for the residual blocks, a direct mode is used by the bottom-right pixel with order 0. In other words, this bottom-right pixel uses its own binary representation as an encoded codeword. The remaining pixels in the residual block 910 take the same coding strategy in FIG. 8 to select and use a corresponding Golomb-Rice code table. For example, Golomb-Rice code table GR(3) is used by the pixel with order 1, Golomb-Rice code table GR(1) is used by the pixel with order 2, and so on. Similarly, in the example of FIG. 9B, assume that a residual block 920 is on the boundary with four left adjacent pixels L0, L1, L2 and L3. According to the exemplary Golomb-Rice coding strategy for the residual blocks, Golomb-Rice code table GR(3) is used by the pixel with order 0, Golomb-Rice code table GR(3) is used by the pixel with order 1, Golomb-Rice code table GR(1) is used by the pixel with order 2, and so on. While Golomb-Rice code table GR(0) is used for all the pixels with four left adjacent pixels L0, L1, L2 and L3. The above exemplary coding strategies of how to select and use a corresponding Golomb-Rice code table may be by analyzing experimental data.

Figure 10:
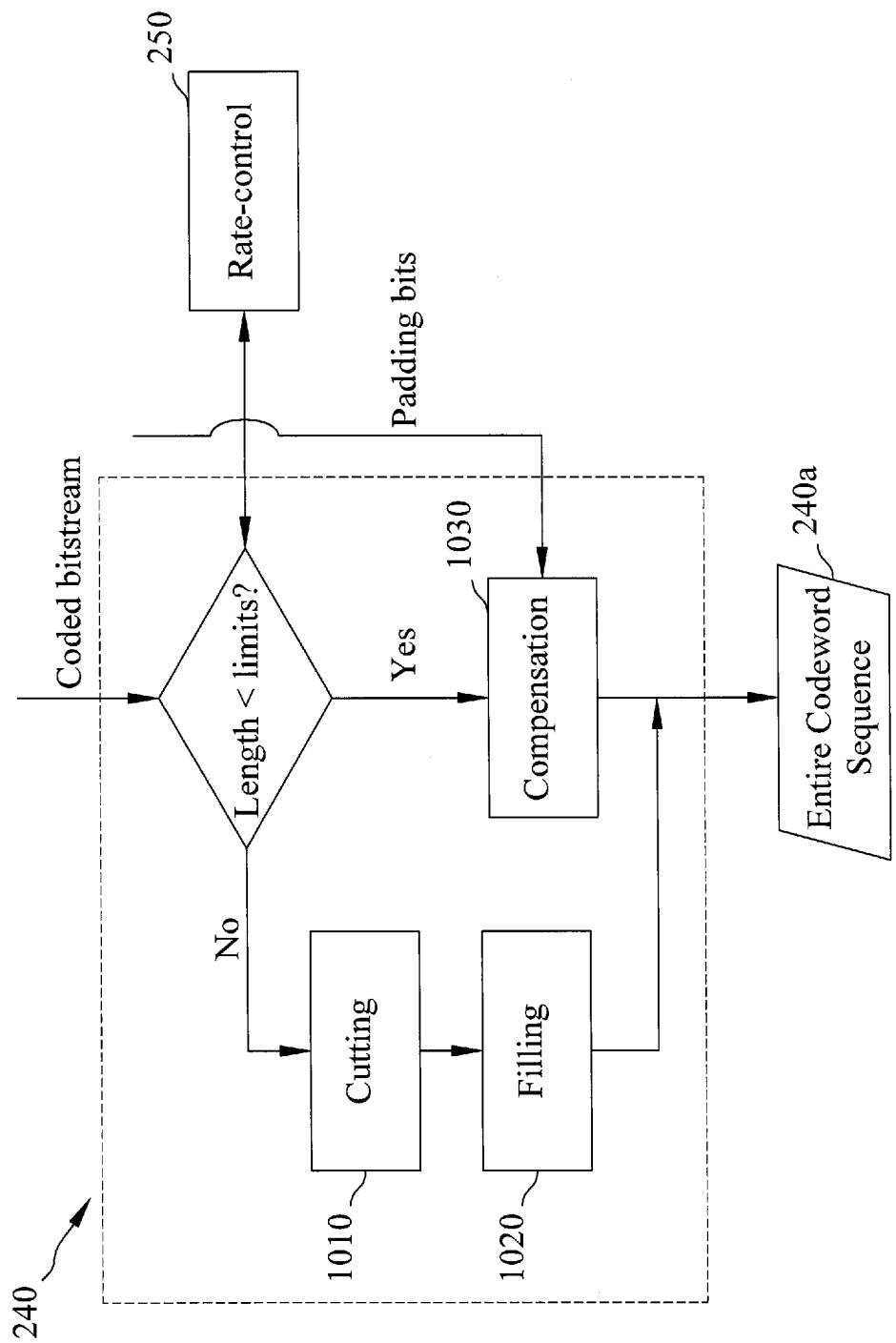
FIG. 10 shows an exemplary flow diagram illustrating the packing, consistent with certain disclosed embodiments.

For a variable-length code, since the length of the coded bitstream of an encoding block might not be able to exactly meet a predefined threshold, i.e. the predefined target bit rate, the packing 240 process on the coded bitstreams so that the length of each coded bitstream is less than or equal to the predefined target bit rate. In other words, the length of each coded bitstream may be able to meet the target bit rate to guarantee the compression rate of each encoding block. Referring to FIG. 10, the packing 240 may includes function steps of cutting 1010, filling 1020 and/or compensation 1030. As shown in FIG. 10, for each coded bitstream, the packing 240 check the length of the coded bitstream. When the length equals to or exceeds a predefined target bit rate, cutting 1010 and filling 1020 are performed. When the length is less than the predefined target bit rate, compensation 1030 is performed. Compensation 1030 is achieved by using the padding bits saved from the quantization 210.

Figure 11:
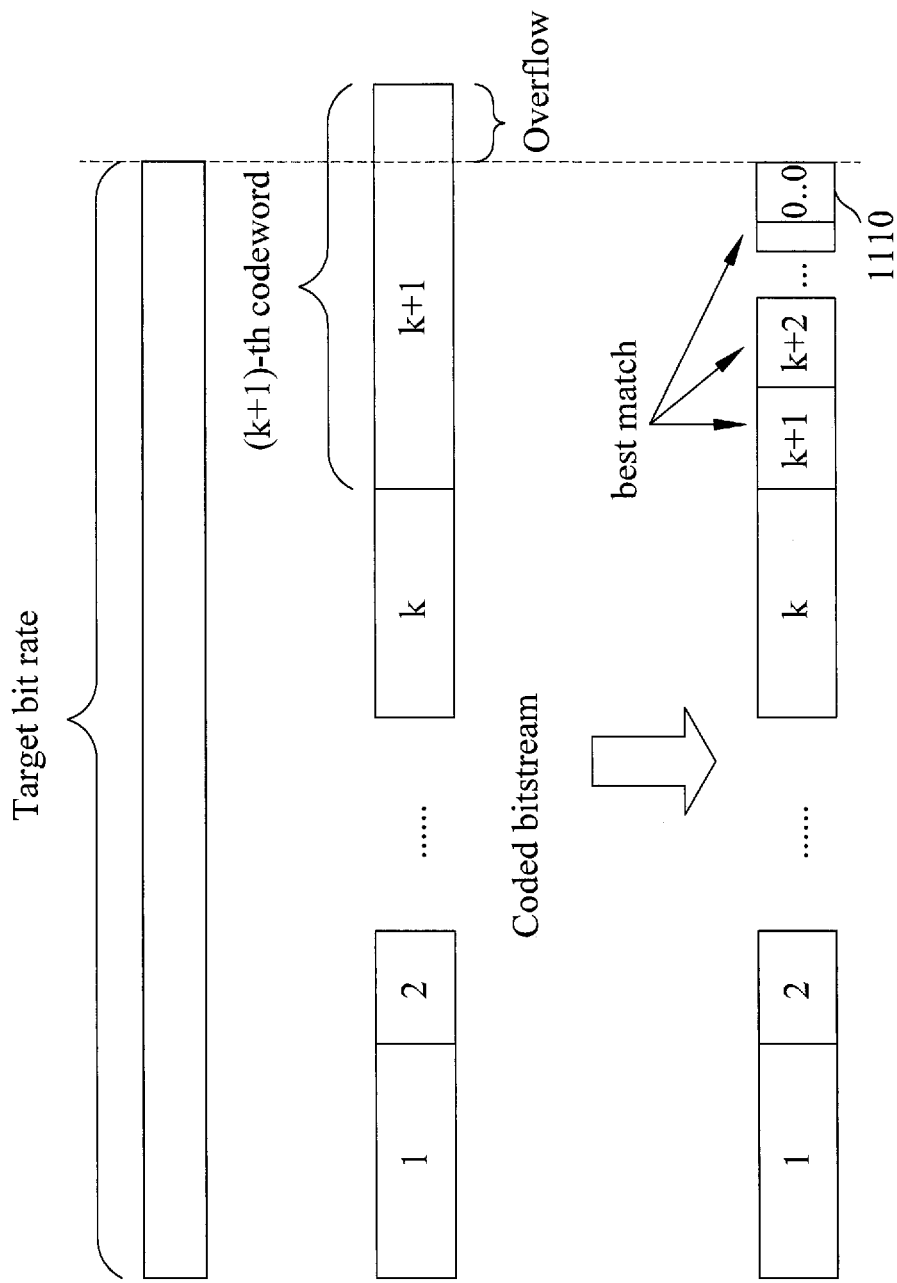
FIG. 11 shows an illustration of the cutting and the filling operations, consistent with certain disclosed embodiments.

FIG. 11 shows an illustration of the cutting and the filling operations, consistent with certain disclosed embodiments. Referring to FIG. 11, Cutting 1010 is operated by removing the (k+1)-th codeword exceeding the target bit rate (target length) from the coded bitstream and choosing the most matching codeword to replace the (k+1)-th codeword, where k is the index of the codeword, k<n×m, such that the total length of the k successive codewords is smaller than the target bit rate, but the total length of the k+1 successive codewords is larger than the target bit rate. The definition of match is the codeword with the maximum length satisfying the remaining available coding space of the coded bitstream after removing the (k+1)-th codeword, where the size of the remaining available coding space is the target bit rate minus the total length of the k successive codewords. If multiple codewords meet the condition and are of the same length, the codeword with coding value close to the coding value of the (k+1)-th codeword is chosen. The reason is each codeword corresponds to a coding value in the coding table.

After coding, if space remains available, the above steps are repeated. That is, follow the prediction order to select the most matched codeword for the residuals that are not yet encoded until no matched codeword can be selected or all the residuals are coded. When space remains available and some residuals inside the residual block that are not yet encoded, but the remaining space is no longer sufficient to select a best matched codeword, a special bitstream (for example, all-zero or all-one) is used to fill the remaining space. In the FIG. 11, the exemplary special bitstream 1110 is all-zero. In other words, when space remains available, filling 1020 is performed by recursively finding a plurality of matched (approximate) codewords for the not yet encoded residuals. When the remaining space is no longer sufficient to select a best matched codeword, i.e. no more matched codeword is found, filling 1020 is performed by padding with a special bitstream such as all-zero or all-one.

Figure 3:
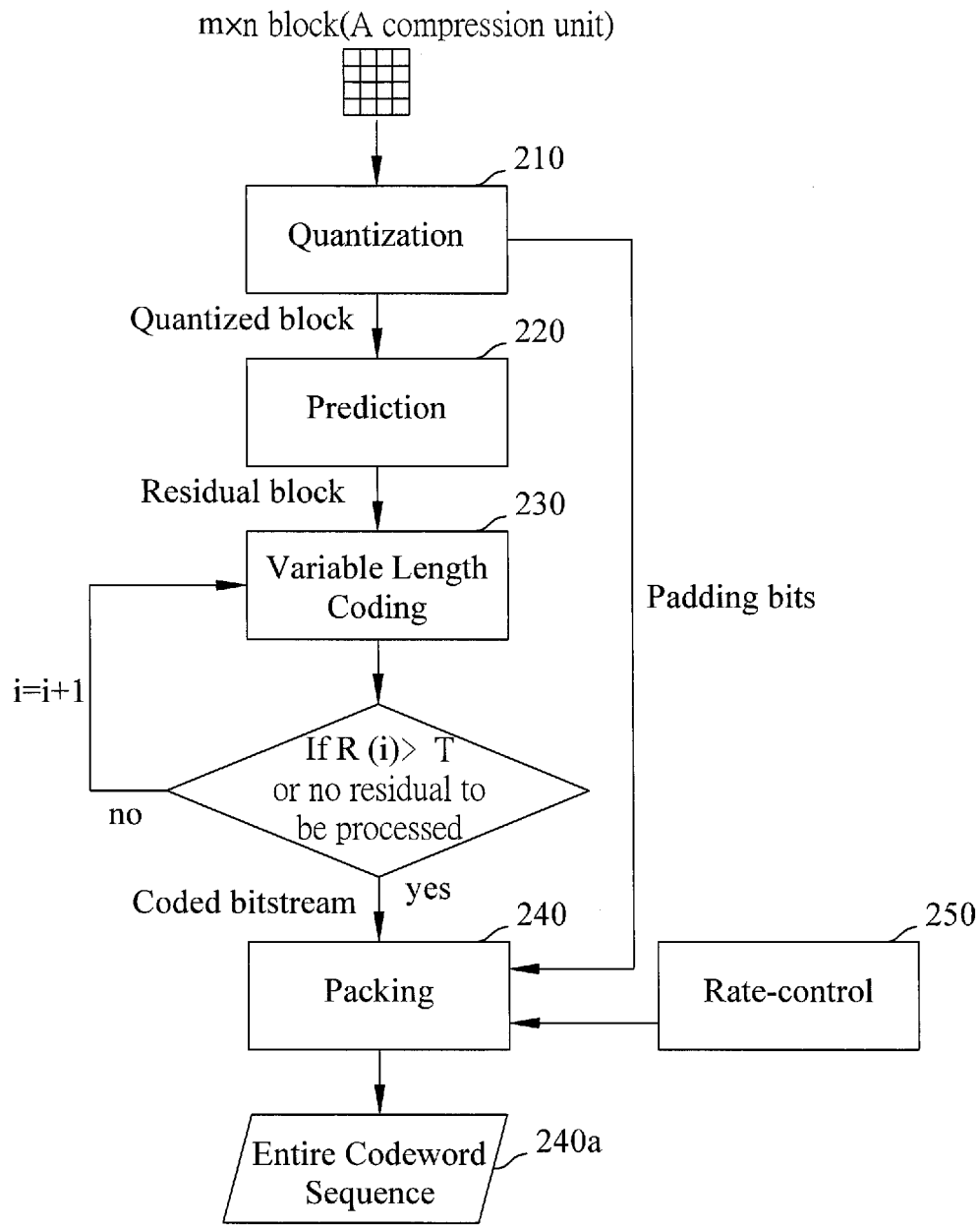
FIG. 3 shows another variation of the compression technique shown in FIG. 2, consistent with certain disclosed embodiments.

For the variation case of the compression technique shown in FIG. 3, it can be known in advance that encoding the (k+1)-th codeword will exceed the target bit rate (target length), therefore the step of cutting 1010 may be omitted.

Figure 12:
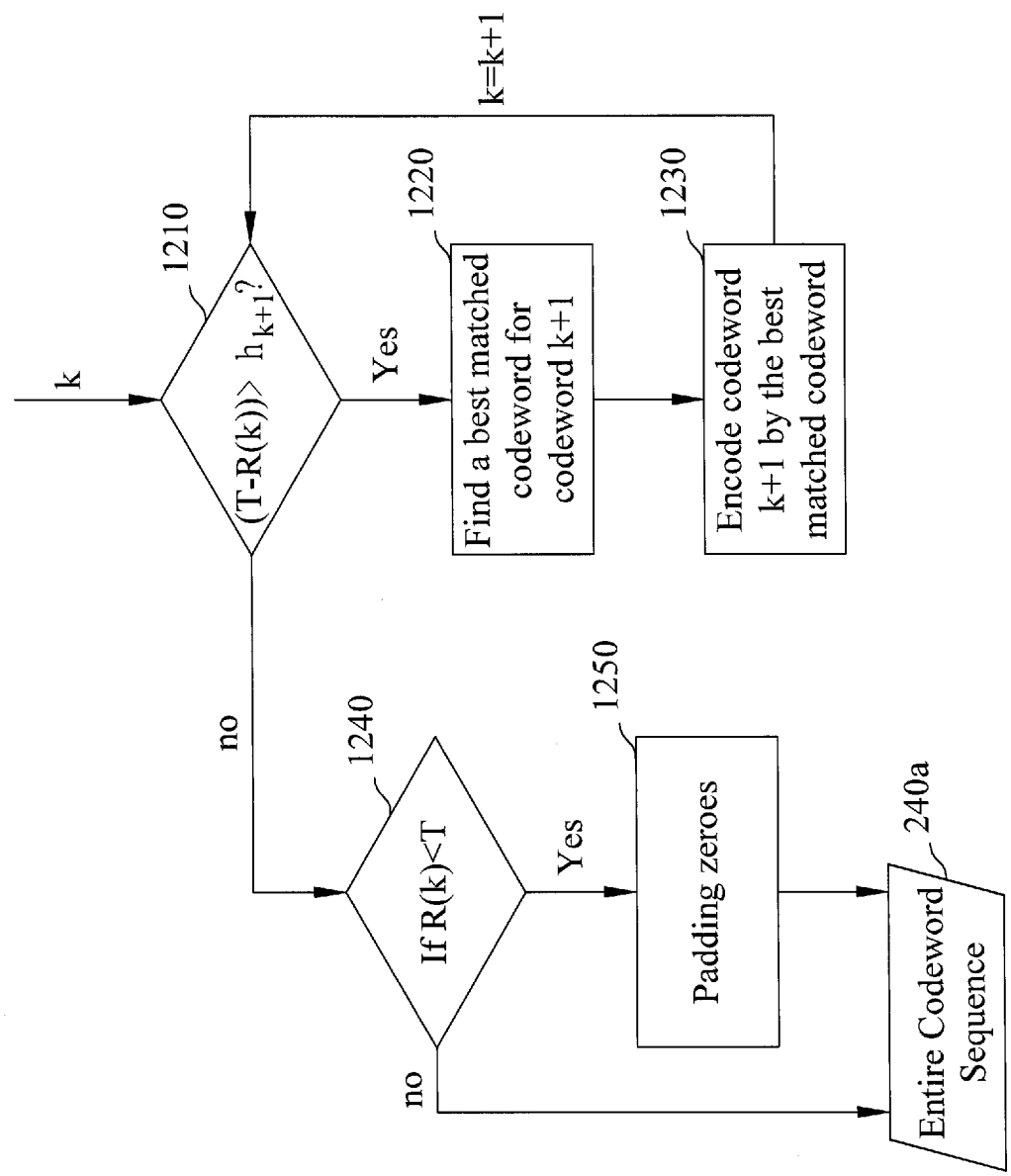
FIG. 12 shows an exemplary flow diagram of the cutting and the filling operations, consistent with certain disclosed embodiments.

Accordingly, FIG. 12 shows an exemplary flow diagram of the cutting and the filling operations, consistent with certain disclosed embodiments. Referring to FIG. 12, for a codeword index k (k<n×m), whether the minimum length $h_{k+1}$ among the codewords in the variable length coding table to be used to encode (k+1)-th residual is less than the remaining available coding space of the coded bitstream is checked. Namely, if (T−R(k)) is greater than $h_{k+1}$ is checked (step 1210), where T denotes the given target bit rate and R(k) denotes the codeword length of the first k successive residuals. If so, find a best matched codeword for codeword k+1 (step 1220) and encode (k+1)-th residual by the matched codeword (step 1230), then increasing the codeword index k by 1 and repeat the steps of 1220 and 1230, until no more satisfied codeword could be found. Otherwise, whether the total length of the k successive codewords is smaller than the target bit rate is checked. Namely, if R(k) is less than T is checked (step 1240). When R(k) is less than T, a special bitstream such as an all-zero stream is used to fill the remaining space, namely padding zeros (step 1250).

As mentioned before, when all the pixels are encoded and the length of the codeword is less than the target bit rate, the save compensation bits (padding bits) from the quantization 210 are used for pixel compensation. In the disclosure, the importance of the padding bits is represented by a specially designed order, called padding order, where a bit with smaller padding order is often more significant than that with higher padding order. In other words, a bit with a smaller padding order has a higher importance used for pixel compensation, and the padding begins with a bit of the smallest padding order. Therefore, the remaining space of the coded bitstream is recursively padded with the padding bits according to the padding order until no more space is available or all the padding bits are used. Compensation 1030 follows the same order of prediction coding, and follows the reverse order of the quantization step, which effectively utilizes the remaining space for compensating the quality of the coded block by padding with the padding bits. The padding bits are one of the outputs of the quantization step, and will be filled back to the remaining space of the coded bitstream bit-by-bit until all the padding bits are used or the length of the coded bitstream reaches the target bit rate.

Figure 13:
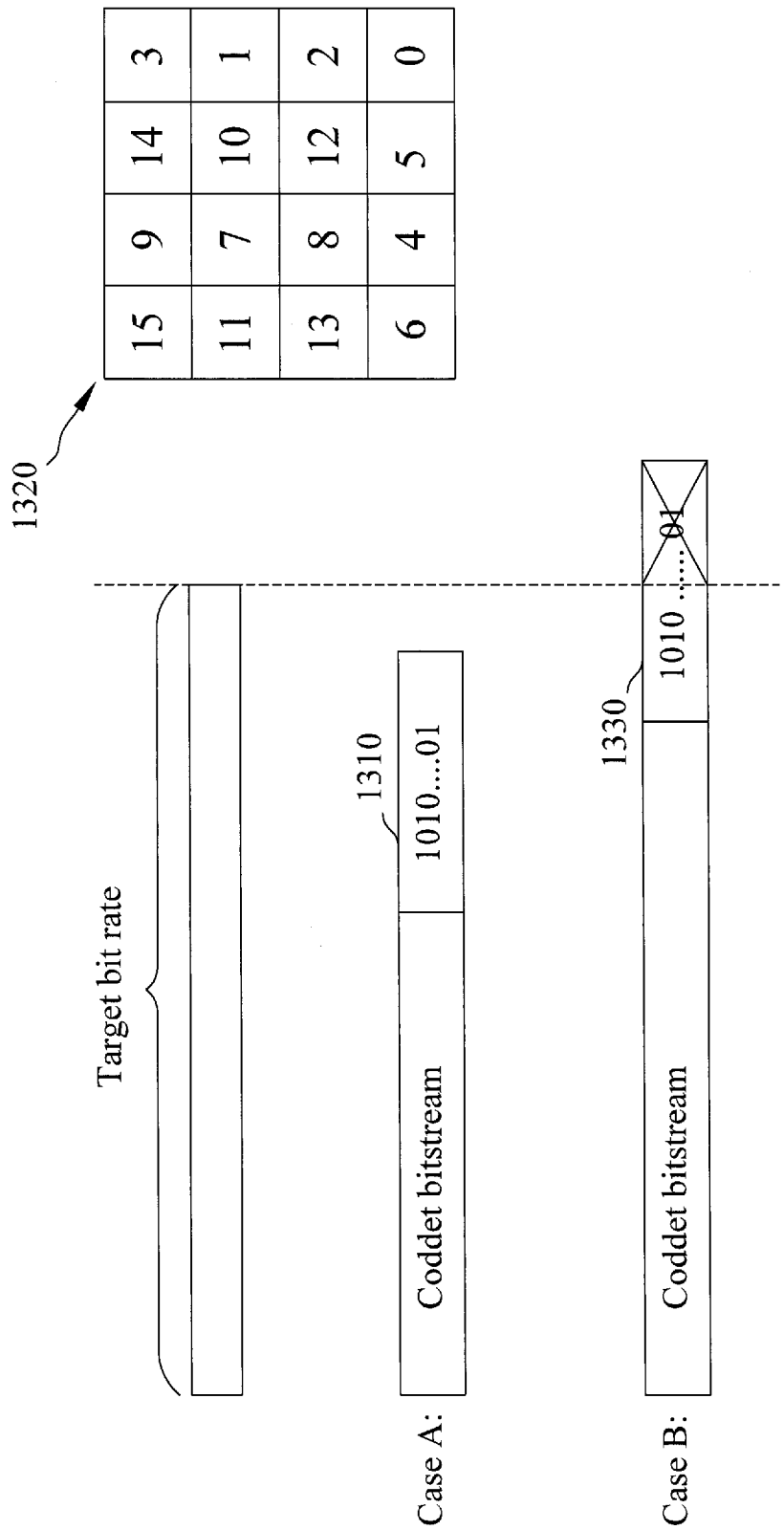
FIG. 13 shows an illustration of the compensation operation, consistent with certain disclosed embodiments.

FIG. 13 shows an illustration of the compensation operation, consistent with certain disclosed embodiments. In FIG. 13, case A is the situation that the available space, i.e. the difference value between the target bit rate and the length of coded stream, is larger than the total number of padding bits 1310, then all the padding bits may be successfully padded according to an exemplary padding order 1320; case B is the situation that the available space is less than the total number of padding bits, only some of the padding bits labeled as 1330, are used to fill back to the coded bitstream according to padding order 1320.

As mentioned earlier, when performing packing 240, the rate-control 250 is designed by using the structure called GOB to flexibly share available spaces of the blocks in the same GOB. In other words, the blocks may obtain additional space from the other blocks in the same GOB. The size of a GOB may be M×N, where M and N may be different. W≥M≥m and L≥N≥n. That is, M and N must be less than the width and length of the input image frame, and greater than the width and length of the compression block. The width and length of the compression image is not necessary to be divisible by M and N.

Figure 14:
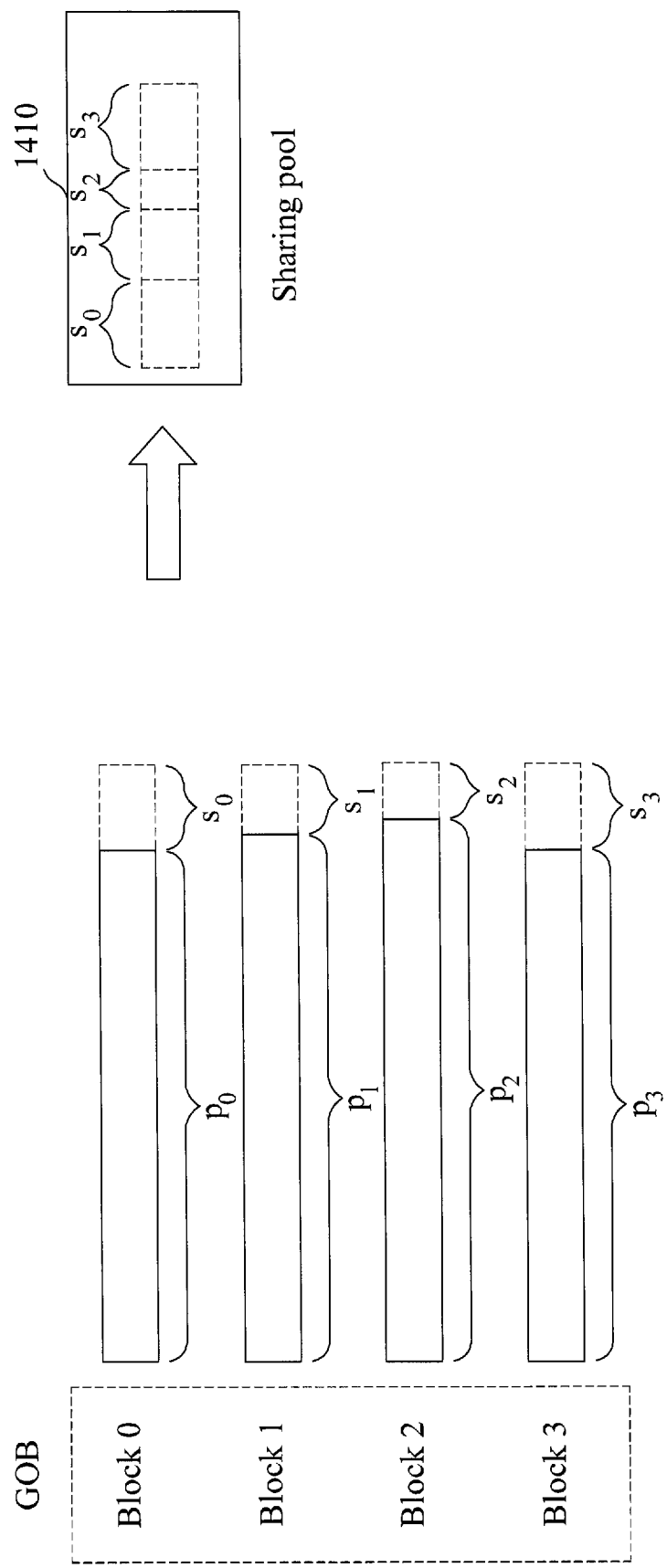
FIG. 14 shows an illustration of the rate-control technique, consistent with certain disclosed embodiments.

FIG. 14 shows an illustration of the rate-control technique, consistent with certain disclosed embodiments. Assume that a GOB in FIG. 14 includes 4 blocks denoted by block 0~block 3, and each block i of the same GOB will provide a sharable bit rate $s_i$ before block compression, i=0, 1, 2, 3. All the sharing spaces are collected and recorded by a sharing pool 1410. Let SP(i) denote the total number of shared bit rates to record the length of the sharing pool 1410 when block i is going to be encoded. The initial value SP(0)=$s_0$+$s_1$+$s_2$+$s_3$. Let T(i) denote the total available bit rate of block i, and $p_i$ denote the remaining available bit rate of block i after subtracting the sharable bit rate. Let block_len(i) denote the length of coded bitstream for the block i after coding. Therefore, the total available bit rate T(i) of block i is computed as T(i)=$p_i$+SP(i) and SP(i+1)=T(i)−block_len(i).

This equation of T(i)=$p_i$+SP(i) and SP(i+1)=T(i)−block_len(i) is a generic form. The rate-control for each block i is computed in details as follows.

$$SP(0) = \sum_{j=0}^{N \times M-1} s_j,$$

$$T(0) = p_0 + SP(0) = p_0 + \sum_{j=0}^{N \times M-1} s_j,$$

$$SP(1) = T(0) - \text{block\_len}(0) = p_0 + \sum_{j=0}^{N \times M-1} s_j - \text{block\_len}(0),$$

$$T(1) = p_1 + SP(1) = p_1 + p_0 + \sum_{j=0}^{N \times M-1} s_j - \text{block\_len}(0),$$

$$SP(2) = T(1) - \text{block\_len}(1) =$$

$$p_1 + p_0 + \sum_{j=0}^{N \times M-1} s_j - \text{block\_len}(0) - \text{block\_len}(1),$$

$$T(2) = p_2 + SP(2) = p_2 + p_1 + p_0 + \sum_{j=0}^{N \times M-1} s_j -$$

$$\text{block\_len}(0) - \text{block\_len}(1), \ldots ,$$

and $$SP(i) = \sum_{j=0}^{i-1} p_j + \sum_{j=0}^{N \times M-1} s_j - \sum_{j=0}^{i-1} \text{block\_len}(j)$$

$$T(i) = p_i + SP(i) = \sum_{j=0}^{i} p_j + \sum_{j=0}^{N \times M-1} s_j - \sum_{j=0}^{i-1} \text{block\_len}(j).$$

Figure 15:
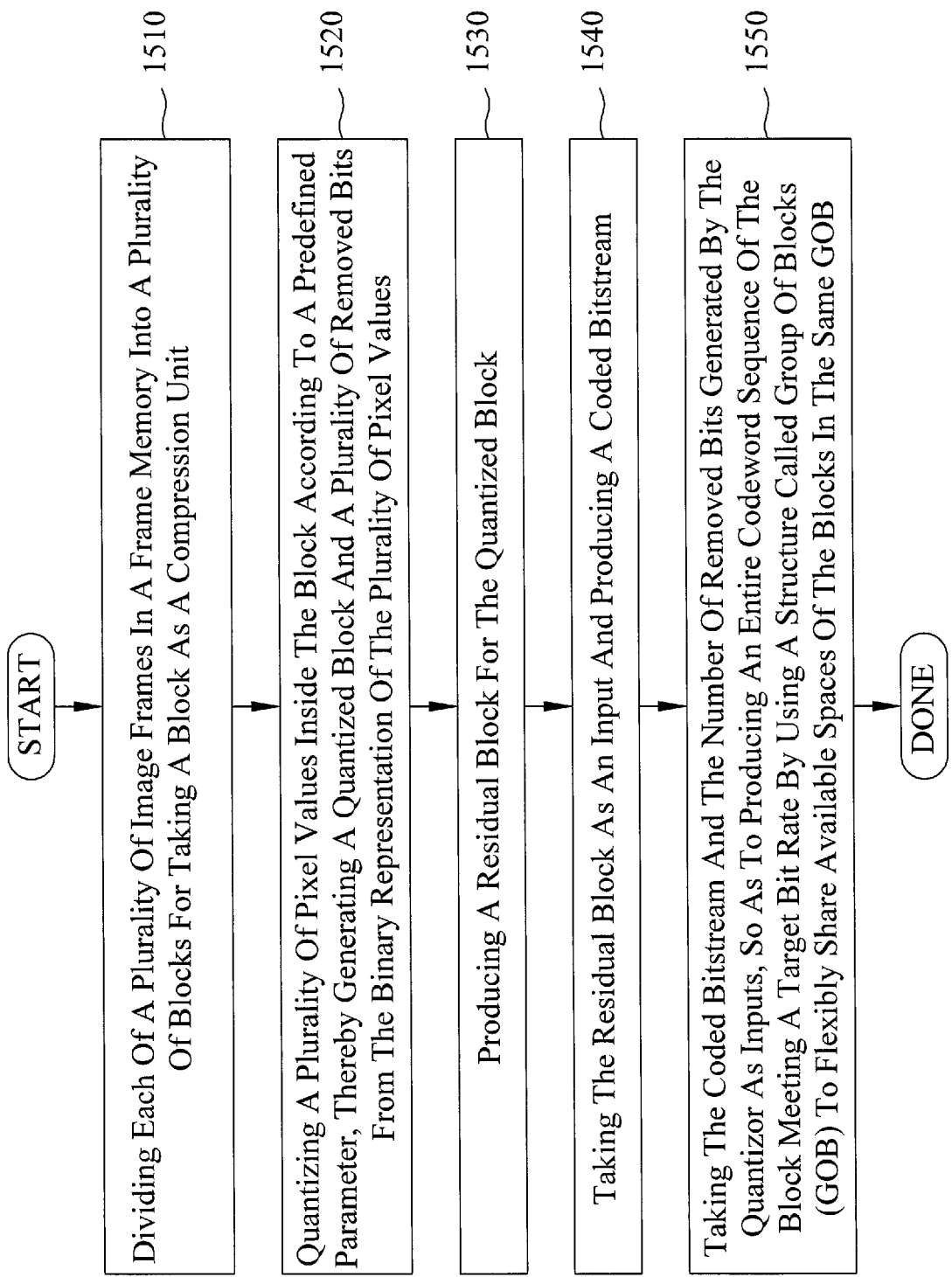
FIG. 15 shows an exemplary flow diagram illustrating the operation of a method for frame memory compression, consistent with certain disclosed embodiments.

Now, a method for compressing a given image frame are described, where the method may be adapted to a video processor at least including a quantizer, a predictor, a variable length encoder, and a packing unit. FIG. 15 shows an exemplary flow diagram illustrating the operation of the method for frame memory compression, consistent with certain disclosed embodiments. Referring to FIG. 15, each of a plurality of image frames in a frame memory is divided into a plurality of blocks for taking a block as a compression unit, as shown in step 1510. The quantizer may quantize a plurality of pixel values inside the block according to a predefined parameter, thereby generating a quantized block and a plurality of removed bits from the binary representation of the plurality of pixel values, as shown in step 1520. The predictor may produce a residual block for the quantized block, as shown in step 1530. The variable length encoder may take the residual block as an input and produce a coded bitstream, as shown in step 1540. The packing unit may take the coded bitstream and the number of removed bits generated by the quantizer as inputs, so as to produce an entire codeword sequence of the block that meets a target bit rate by using a structure called group of blocks (GOB) to flexibly share available spaces of the blocks in the same GOB, as shown in step 1550.

The further detail operations described earlier for the portions of quantization, prediction, variable length coding, and packing and rate-control may be implemented in the quantizer, the predictor, the variable length encoder, and the packing unit, respectively.

If a given target bit rate is large enough, the FMC technique in the present disclosure may achieve lossless compression performance. In some applications, it might require the target bit rate to be small, and the FMC technique in the present disclosure may be near-lossless in the cases. In this disclosure, a distorted block indication (DBI) method is also provided to identify whether the distortion of encoding a block in an image frame exceeds a predefined threshold. The scheme to identify may proceed as follows (but not limited to this case). When a compressed block is reconstructed by a FMC decoder, the coding bit rate of the block may be obtained. If the coding bit rate violates the pre-defined threshold (for example, larger than the threshold), the distorted block is labeled. In other words, by using the FMC technology of the present disclosure, the blocks with distortion exceeding the pre-defined threshold may be found.

The disclosed DBI scheme is useful for motion-compensated video compressions, such as H.264/AVC, H.263 and MPEG-4, where the current frame refers to previous frames for motion estimation. When a video processor refers to an image frame reconstructed by the disclosed FMC technology as reference to search the motion vector, it may know the distorted blocks, and then it may process those distorted blocks properly to avoid error propagation due to motion prediction.

Figure 16:
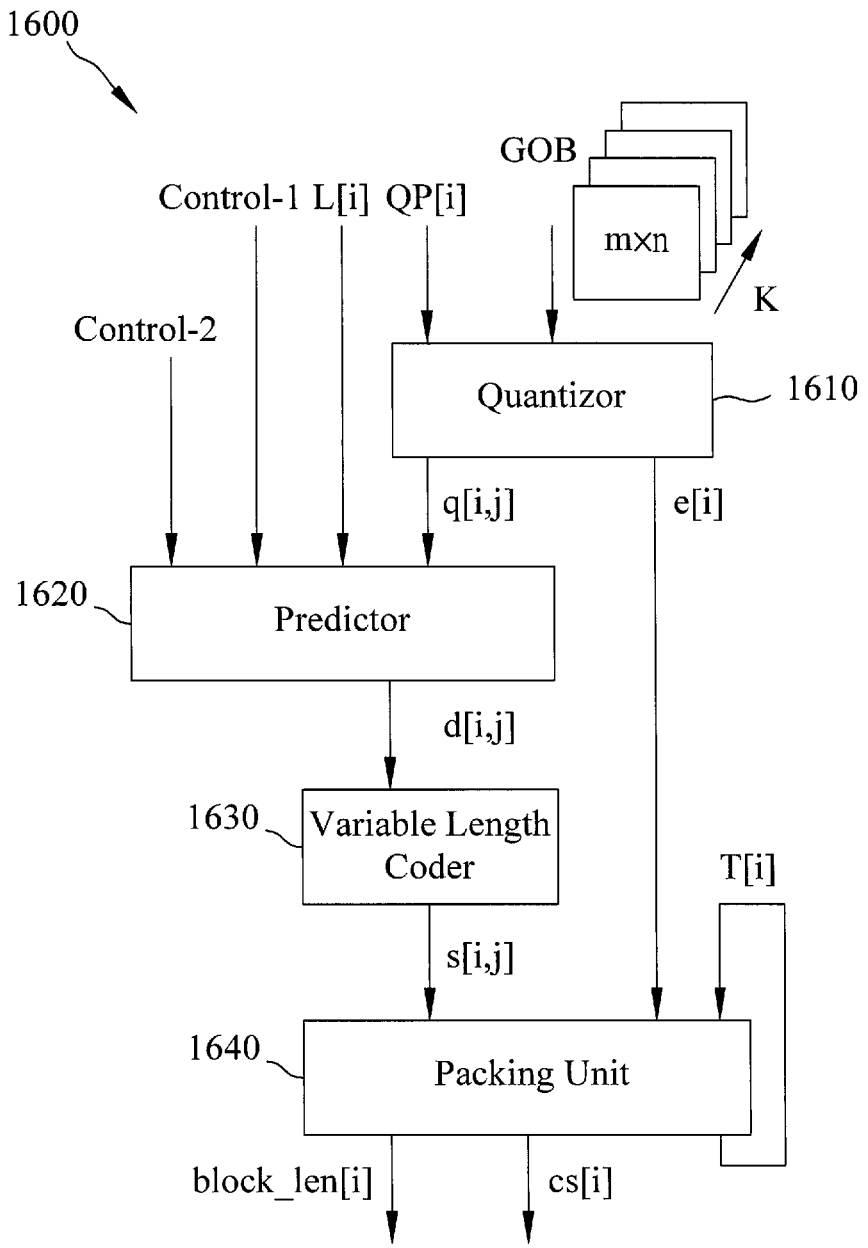
FIG. 16 shows an exemplary block diagram of an apparatus for frame memory compression, consistent with certain disclosed embodiments.

Now, an apparatus for frame memory compression will be described with reference to FIG. 16, which shows an exemplary block diagram of the apparatus, consistent with certain disclosed embodiments. Wherein, the apparatus may be adapted to a video processor with each of a plurality of image frames in a frame memory being divided into a plurality of blocks for taking a block as a compression unit. Referring to FIG. 16, the apparatus for frame memory compression 1600 may comprise a quantizer 1610, a predictor 1620, a variable length coder 1630, and a packing unit 1640. The input data of the apparatus 1600 include boundary data L[i], quantization parameter QP[i] and a sequence of k blocks of m×n pixels, wherein i is the block index and i=1, . . . , k. First, for each of block i, the m×n pixels are quantized according to the values of quantization parameter QP[i]. In exemplary embodiments, the quantization performed by quantizer 1610 may be based on shortening the number of bits, for example, it may be implemented with the most significant 8-QP[i] bits of each pixel taken as the quantized result, and depicted as $MSB_{8-QP[i]}(p[i,j])$, wherein p[i,j] is the j-th pixel of the i-th block, j=1, . . . , mn, and the function $MSB_u(x)$ returns the most significant u bits of a pixel x.

Figure 17:
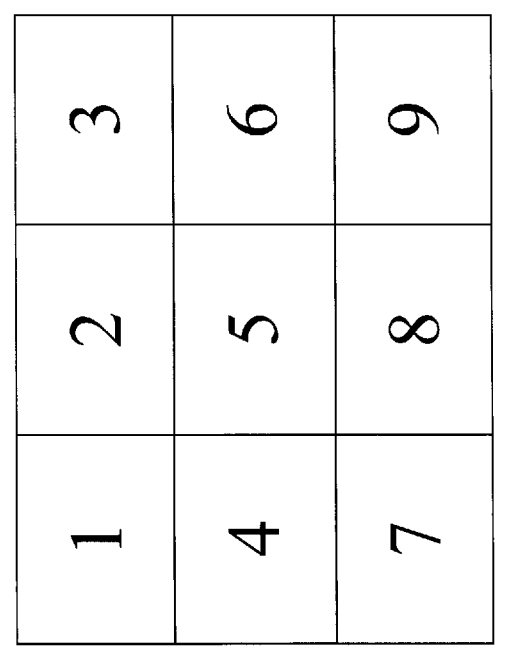

After quantization, the exemplary output of quantizer 1610 is $q[i,j]=MSB_{8-QP[i]}(p[i,j])$, and all the cut-off bits are saved as a set $e[i]=\{LSB_{QP[i]}(p[i,j]): j=1,\ldots,mn\}$, i.e. padding bits, for packing stage. $LSB_{QP[i]}(p[i,j])$ takes QP[i] least significant bits of p[i,j]. In other words, the function $LSB_u(x)$ returns the least significant u bits of a pixel x. Take QP[i]=2 as example. Assume that a bit representation for p[0,0]= 8'b10101001, which means that pixel p[0,0] is represented by a 8-bit stream of 10101001, then $q[0,0]=MSB_{8-2}(p[0,0])=$ 6'b101010, and $LSB_2(p[0,0])=2'b01$, The bit-order of e[i] may follow a predicted priority of the prediction from the MSB to LSB. Assume that a block has 9 pixels, and an exemplary pixel index for illustrating an exemplary specified prediction priority may be as shown in the FIG. 17. Referring to FIG. 17, if the prediction priority is 9, 3, 6, 7, 8, 2, 5, 4, 1, then padding bits $e[i]=\{LSB_{QP[i]}(p[i,9]), LSB_{QP[i]}(p[i,3]), LSB_{QP[i]}(p[i,6]), LSB_{QP[i]}(p[i,7]), LSB_{QP[i]}(p[i,8]), LSB_{QP[i]}(p[i,2]), LSB_{QP[i]}(p[i,5]), LSB_{QP[i]}(p[i,4]), LSB_{QP[i]}(p[i,1])\}$.

For producing an m×n residual block, predictor 1620 uses two input data, i.e. boundary data L[i] and quantization q[i,j], and two control inputs Control-1, Control-2. Control-1 is for recognizing the valid status of boundary value L[i]. For example, when Control-1 is FALSE, it indicates that this prediction does not have boundary and the prediction computation will only be based on q[i,j]. When Control-1 is TRUE, it indicates that L[i] is valid. Predictor 1620 uses Control-2 to determine the status of a valid boundary when Control-1 is TRUE. In exemplary embodiments, Control-2 is used for selecting the combination of three boundary status values, namely, referencing left and upper boundaries simultaneously, referencing only left boundary, and referencing only upper boundary. L[i] includes m+n values, wherein the upper boundary for block i includes n values and the left boundary includes m values, for example, with each value having 8-QP[i] bits. Predictor 1620 performs prediction computations for q[i,j] and L[i], and generates a difference d[i,j] between q[i,j] and a prediction value of q[i,j], i.e. difference d[i,j] is a residual for pixel p[i,j].

After obtaining the difference d[i,j], variable length coder 1630 uses a table-lookup method to perform coding on each d[i,j], wherein a corresponding code may be found for each value of d[i,j], and s[i,j] is all the codes outputted in a specified order. Having the same order as e[i] and inputting in the reverse prediction order, taking the e[i] as example, variable length coder 1630 will output a coded stream s[i,j] for the block i in the order of s[i,1], s[i,4], s[i,5], s[i,2], s[i,8], s[i,7], s[i,6], s[i,3] and s[i,9].

Figure 18:
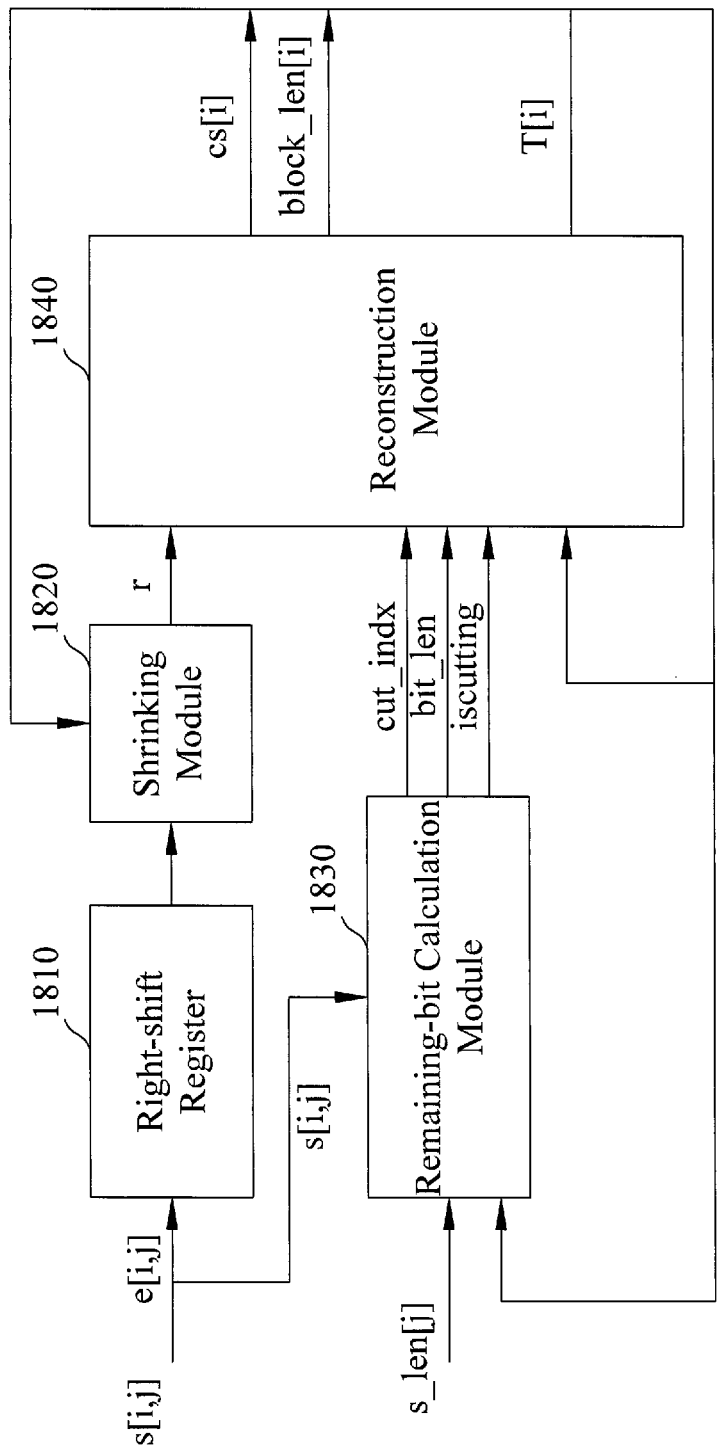
FIG. 18 shows an exemplary block diagram of packing unit 1640, consistent with certain disclosed embodiments.

After obtaining the coded stream s[i,j] for the block i, packing unit 1640 performs packing operations according to coded stream s[i,j], padding bits e[i] and a predetermined target bit rate T[i]. T[i] is the maximum bit length of cs[i] outputted by packing unit 1640. FIG. 18 shows an exemplary block diagram of packing unit 1640, consistent with certain disclosed embodiments. Referring to FIG. 18, packing unit 1640 may include a right-shift register 1810, a shrinking module 1820, a remaining-bit calculation module 1830, and a reconstruction module 1840. Right-shift register 1810 has a maximum length of T[0] bits. Shrinking module 1820 performs an operation of $MSB_{T[i]}$ on right-shift register 1810. In other words, shrinking module 1820 extract the MSB T[i] bits from right-shift register 1810, i.e., an output value of a register r generated by shrinking module 1820 is $MSB_{T[i]}(R)$, and R represents a bit stream in the right-shift register 1810. The followings describe detailed operation for each block unit of packing unit 1640.

Figure 19:
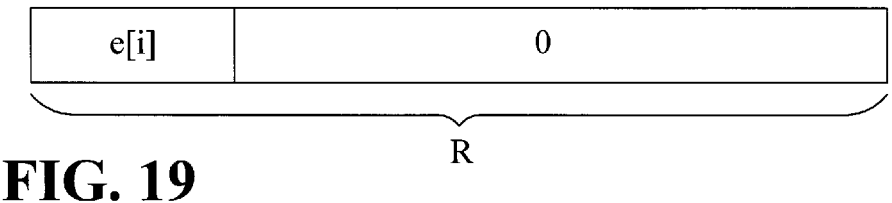
FIG. 19 shows the scenario that e[i] is right-shifted into the MSB bits of right-shift register whenever coding a new block, consistent with certain disclosed embodiments.

Whenever coding a new block i, right-shift register 1810 will be reset such as to all-zero. First, e[i] is right-shifted into the MSB bits of right-shift register 1810, as shown in FIG. 19. Then, s[i,j] is inputted according to the prediction order, where s[i] denotes the codeword formed by concatenating the input sequence of s[i,j] with the ordered input priority. The input with lower priority is placed at the LSB, while the higher priority is placed at the MSB. Take the aforementioned exemplary embodiment as example, s[i]={s[i,9], s[i,3], s[i,6], s[i,7], s[i,8], s[i,2], s[i,5], s[i,4], s[i,1]}. |s[i]| denotes the bit length of the concatenation of all s[i,j], and |e[i]| is the bit length of e[i]. Usually, |e[i]|=mn×QP[i]. If |s[i]|+|e[i]|<T[i], the result of shift and shrink will be as shown in FIG. 20, indicating s[i] and e[i] are all saved in the register r, namely, coding for the new block is without any distortion.

Figure 21:
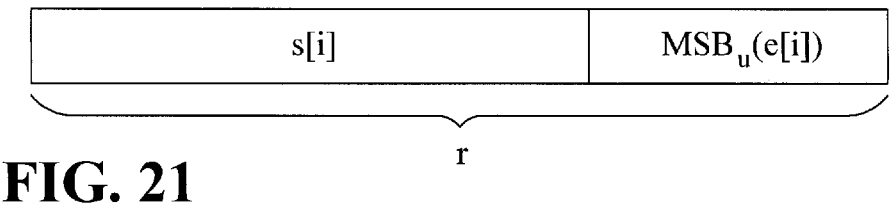
FIG. 21 shows an exemplary result of shift and shrink for a second exemplary scenario that |s[i]|<T[i] and |s[i]|+|e[i]|>T[i], consistent with certain disclosed embodiments.

However, if |s[i]|<T[i] and |s[i]|+|e[i]|>T[i], the result of shift and shrink will be shown as FIG. 21, where u=T[i]−|s[i]|, indicating the value of e[i] is cut off, namely, some of padding bits are truncated. In other words, s[i] and $MSB_u$ (e[i]) are saved in the register r. If |s[i]|=T[i], the result of shift and shrink will be shown as FIG. 22, indicating s[i] are all saved while e[i] disappear completely.

Figure 20:
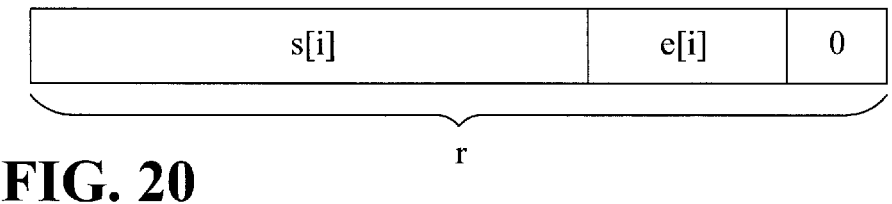
FIG. 20 shows an exemplary result of shift and shrink for a first exemplary scenario that |s[i]|+|e[i], consistent with certain disclosed embodiments.
Figure 22:
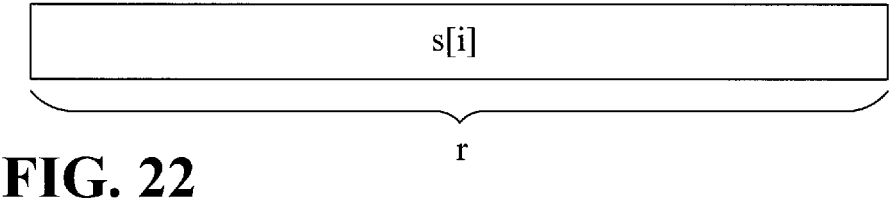
FIG. 22 shows an exemplary result of shift and shrink for a third exemplary scenario that |s[i]|=T[i], consistent with certain disclosed embodiments.

When the length is one of the three scenarios, i.e. FIGS. 20-22, remaining-bit calculation module 1830 computes a flag called is cutting as FALSE, and reconstruction module 1840 outputs the value r directly to a register cs[i], and sets the block length block_len[i] for the block i to be T[i].

Figure 23:
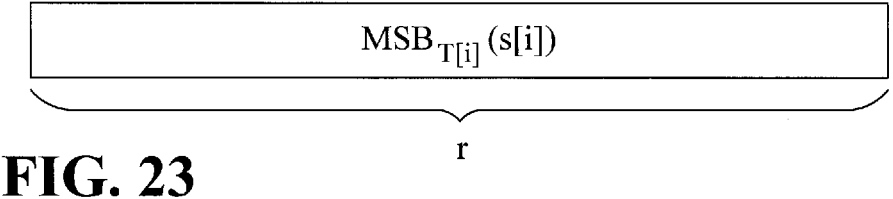
FIG. 23 shows an exemplary result of shift and shrink for a fourth exemplary scenario that |s[i]|>T[i], consistent with certain disclosed embodiments.
Figure 24:
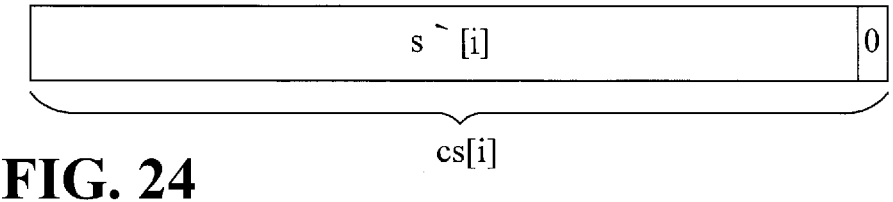
FIG. 24 shows an exemplary entire codeword sequence of a block performed by a reconstruction module, consistent with certain disclosed embodiments.

The last scenario is when |s[i]|>T[i], it will occur that the codeword is cut off, and the value r will be shown as s FIG. 23, namely, only $MSB_{T[i]}(s[i])$ is saved in the register r. When the scenario occurs, remaining-bit calculation module 1830 sets the flag is cutting as TRUE to indicate the length of s[i] is greater than T[i]. Remaining-bit calculation module 1830 further outputs an index cut_indx to inform which s[i,j] in the s[i] is cut off according to the length s_len[j] of the input codeword to be informed, and a bit length bit_len to inform the available remaining length. Take s[i]={s[i,9], s[i,3], s[i,6], s[i,7], s[i,8], s[i,2], s[i,5], s[i,4], s[i,1]} as example. Assume that both s[i,4] and s[i,1] are right-shifted out of the range of register r, and s[i,5] is partially saved within register r. At this point, cut_indx=5 and bit_len=|T[i]|−|{s[i,9], s[i,3], s[i,6], s[i,7], s[i,8], s[i,2]}|. The situation that s[i,5] is cut off indicates the available remaining length bit_len is less than |s[i,5]|. At this point, reconstruction module 1840 will search for, according to the bit_len, a codeword with the most suitable length to replace the cut-off s[i,5], and output a new value of register r. Assume that the newly found codeword to replace the cut-off s[i,5] denotes as s'[i..5] and |s'[i,5]| is less than the available remaining length bit_len, then the value in the register cs[i] will be shown as FIG. 24, wherein s'[i]={s[i,9], s[i,3], s[i,6], s[i,7], s[i,8], s[i,2], s' [i,5]}, and the remaining bits in the register cs[i] are all filled with zeros. In other words, the value in the register cs[i] is an entire codeword sequence of block i produced by reconstruction module 1840. Finally, reconstruction module 1840 may output the entire codeword sequence of block i, its valid block length block_len[i] and its total available bit rate T[i]. The total available bit rate T[i] will be fed back to packing unit 1640 to process packing operations for next new block.

Some exemplary experiments are performed to observe whether the disclosed frame memory compression (FMC) technique may achieve lossless compression performance FIG. 25 shows exemplary experimental parameters, where 8 typical video sequences with 1080p resolution are used. Under the exemplary experimental environment, all the blocks using the disclosed FMC technique may complete coding by using QP=0. In other words, all the blocks using the disclosed FMC technique may achieve lossless compression under the requirement of a predefined target bit rate. When QP=1 is used, most of blocks may complete coding under the requirement of a predefined target bit rate. If the given target bit rate is required to be small enough, the disclosed FMC technique may be near-lossless. If the given target bit rate is large enough, all the blocks using the disclosed FMC technique may achieve lossless compression.

Some exemplary experiments are further performed to observe the compression performance using the disclosed FMC technique under different sizes of a GOB. Wherein, three different sizes of 4×4 GOB, 16×4 GOB, and 16×16 GOB are employed. The experimental results show that the 16×16 GOB achieves the best compression performance among the three different GOB sizes. In other words, the disclosed rate-control technique by using the GOB based structure may further improve the entire compression performance of a video processor.

Although the disclosure has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for frame memory compression, adapted to a video processor at least including a quantizer, a predictor, a variable length encoder, and a packing unit, said method comprising:
 dividing each of a plurality of image frames in a frame memory into a plurality of blocks for taking a block as a compression unit;
 applying said quantizer to quantize a plurality of pixel values inside said block according to a predefined parameter, thereby generating a quantized block and a plurality of removed bits from a binary representation of said plurality of pixel values;
 applying said predictor to produce a residual block for said quantized block;
 applying said variable length encoder to take said residual block as an input and produce a coded bitstream; and
 applying said packing unit to take said coded bitstream and said plurality of removed bits generated by said quantizer as inputs, so as to produce an entire codeword sequence of said block that meets a target bit rate by using a structure called group of blocks (GOB) to flexibly share available spaces of the blocks in the same GOB;
 wherein said packing unit checks whether or not a length of said coded bitstream is less than said target bit rate, and a cutting and a filling are performed when the length equals to or exceeds said target bit rate, and a compensation is performed when the length is less than said target bit rate, said cutting being operated by removing a (k+1)-th codeword used in said variable length encoder exceeding said target bit rate from said coded bitstream and choosing a best matched codeword to replace the (k+1)-th codeword, where k is a codeword index, such that the total length of k successive codewords used in said variable length encoder is smaller than said target bit rate, but the total length of the k+1 successive codewords used in said variable length encoder is larger than said target bit rate.

2. The method as claimed in claim 1, wherein a GOB is a group of neighboring blocks of said block, and is a basic rate-control unit.

3. The method as claimed in claim 1, wherein said quantizer quantizes said plurality of pixel values inside said block by removing said number of removed bits in an order of from the least significant bit to the most significant bit in the binary representation of each of said plurality of pixel values.

4. The method as claimed in claim 1, wherein said predictor predicts said plurality of pixel values inside said block pixel-by-pixel in a special predetermined order, according to boundary data of said block.

5. The method as claimed in claim 1, wherein said plurality of removed bits generated by said quantizer are kept for pixel compensation during said packing unit producing said entire codeword sequence.

6. The method as claimed in claim 1, wherein said packing unit utilizes a remaining available space to compensate the quality of said coded bitstream by padding with said plurality of removed bits back to said remaining space of said coded bitstream bit-by-bit according to a padding order, until all the removed bits are used or a length of said coded bitstream reaches said target bit rate.

7. The method as claimed in claim 6, wherein said padding order represents the importance of said plurality of removed bits, and a bit with a smaller padding order is more significant than that with a higher padding order.

8. The method as claimed in claim 1, wherein when a remaining space is available and there exists not yet encoded residuals inside said residual block, said filling is performed by recursively finding a plurality of matched codewords for the not yet encoded residuals, and when said remaining space is not sufficient to select a best matched codeword, said filling is performed by padding with a special bitstream.

9. An apparatus for frame memory compression, adapted to a video processor with each of a plurality of image frames in a frame memory being divided into a plurality of blocks for taking a block as a compression unit, said apparatus comprising:
- a quantizer for quantizing a plurality of pixels inside said block according to a quantization parameter, thereby generating a quantized block and a plurality of removed bits from a binary representation of said plurality of pixel values;
- a predictor that uses two control inputs to produce a residual block, according to boundary data of said block and said quantized block;
- a variable length coder that takes said residual block as an input and produce a coded bitstream by using a table-lookup method; and
- a packing unit that takes said coded bitstream and said plurality of removed bits generated by said quantizer as inputs, so as to produce an entire codeword sequence of said block that meets a target bit rate by using a structure called group of blocks (GOB) to flexibly share available spaces of the blocks in the same GOB;

wherein said packing unit further includes:
- a right-shift register for right-shifting said plurality of removed bits into its most significant bits, and right-shifting said coded bitstream according to a prediction order;
- a shrinking module that extract most significant T bits from said right-shift register and returns the most significant T bits to a register, where T is the bit length of said target bit rate;
- a remaining-bit calculation module that computes a flag to indicate whether or not the length of said coded bitstream is greater than said target bit rate, and when said flag is true, said remaining-bit calculation module outputs a codeword index to inform which codeword for said block should be replaced, and a bit length to inform the length of an available remaining space in said register; and
- a reconstruction module that outputs said entire codeword sequence from said register and a block length, according to said flag, said codeword index, said bit length and said target bit rate.

10. The apparatus as claimed in claim 9, wherein said predictor uses one of said two control inputs to recognize a valid status of the boundary data, and the other control input is used to determine the status of a valid boundary.

11. The apparatus as claimed in claim 10, wherein said the other control input selects a combination of three boundary status values, including referencing left and upper boundaries simultaneously, referencing only left boundary, and referencing only upper boundary.

12. The apparatus as claimed in claim 9, wherein when the length of said coded bitstream is greater than said target bit rate, said reconstruction module finds a best matched codeword for replacing the codeword corresponding to said codeword index.

13. The apparatus as claimed in claim 12, wherein when the length of said best matched codeword is less than that of said available remaining space, said flag is set to false and said reconstruction module fills all the remaining bits in said register with zeros.

14. The apparatus as claimed in claim 9, wherein when a total length of said coded bitstream and said plurality of removed bits is less than said target bit rate, said flag is set to false and said coded bitstream and said plurality of removed bits are all saved in said register.

15. The apparatus as claimed in claim 9, wherein when the length of said coded bitstream is less than said target bit rate, but a total length of said coded bitstream and said plurality of removed bits is greater than said target bit rate, said flag is set to false and said coded bitstream and most significant u bits of said plurality of removed bits are saved in said register, where u equals to a difference between said target bit rate and the length of said coded bitstream.

16. The apparatus as claimed in claim 9, wherein when the length of said coded bitstream equals to said target bit rate, said flag is set to false and said coded bitstream is all saved while said plurality of removed bits disappear completely.

* * * * *